(12) United States Patent
Diamond et al.

(10) Patent No.: US 11,514,240 B2
(45) Date of Patent: *Nov. 29, 2022

(54) TECHNIQUES FOR DOCUMENT MARKER TRACKING

(71) Applicant: Oracle International Corporation, Redwood Shores, CA (US)

(72) Inventors: David Diamond, Amherst, NH (US); Michael Gianatassio, Hooksett, NH (US); John Janosik, Nashua, NH (US); Michael Rubino, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/382,718

(22) Filed: Jul. 22, 2021

(65) Prior Publication Data

US 2021/0350071 A1 Nov. 11, 2021

Related U.S. Application Data

(63) Continuation of application No. 15/677,457, filed on Aug. 15, 2017, now Pat. No. 11,106,867.

(51) Int. Cl.
*G06F 40/10* (2020.01)
*G06F 40/197* (2020.01)
(Continued)

(52) U.S. Cl.
CPC .......... *G06F 40/197* (2020.01); *G06F 40/117* (2020.01); *G06F 40/143* (2020.01); *G06F 40/221* (2020.01); *G06F 40/284* (2020.01)

(58) Field of Classification Search
None
See application file for complete search history.

(56) References Cited

U.S. PATENT DOCUMENTS 6,029,167 A  2/2000 Evans
6,438,564 B1  8/2002 Morton et al.
(Continued)

OTHER PUBLICATIONS

U.S. Appl. No. 11/150,070, "Final Office Action", dated Feb. 20, 2008, 17 pages.
(Continued)

*Primary Examiner* — Maikhanh Nguyen
(74) *Attorney, Agent, or Firm* — Kilpatrick Townsend & Stockton LLP

(57) ABSTRACT

The present disclosure describes techniques for adding a marker to a second document, the marker corresponding to a marker in a first document. The process may include identifying a token in a first document associated with a marker based upon a location of the marker in the first document. The process may further include identifying a particular token group that the token belongs to. The particular token group may be identified from a set of token groups for the first document. A particular token group from a set of token groups for the second document is then identified for the particular token group in the first document. A location for placing the marker in the second document is identified based upon the location of the particular token group in the second document. The marker is then placed in the second document at the identified location.

19 Claims, 21 Drawing Sheets

(51) Int. Cl.
*G06F 40/117* (2020.01)
*G06F 40/221* (2020.01)
*G06F 40/284* (2020.01)
*G06F 40/143* (2020.01)

(56) References Cited

U.S. PATENT DOCUMENTS

| | | | |
|---|---|---|---|
| 8,244,530 B2* | 8/2012 | Dean | G06F 16/355 |
| | | | 704/9 |
| 9,275,368 B1 | 3/2016 | Harpalani et al. | |
| 9,569,406 B2* | 2/2017 | Shaver | G06F 40/106 |
| 9,619,448 B2* | 4/2017 | Fischer | G06F 16/93 |
| 2002/0120648 A1 | 8/2002 | Ball et al. | |
| 2003/0125931 A1 | 7/2003 | Campbell | |
| 2004/0083091 A1* | 4/2004 | Ie | G06F 40/194 |
| | | | 704/9 |
| 2004/0093462 A1 | 5/2004 | Roth et al. | |
| 2005/0165747 A1 | 7/2005 | Bargeron et al. | |
| 2006/0015495 A1 | 1/2006 | Keating et al. | |
| 2006/0112120 A1 | 5/2006 | Rohall | |
| 2006/0184452 A1 | 8/2006 | Barnes et al. | |
| 2006/0282430 A1 | 12/2006 | Diamond et al. | |
| 2006/0282762 A1 | 12/2006 | Diamond et al. | |
| 2009/0012777 A1* | 1/2009 | Ie | G06F 40/194 |
| | | | 704/9 |
| 2012/0023073 A1* | 1/2012 | Dean | G06F 16/355 |
| | | | 707/693 |
| 2013/0117660 A1* | 5/2013 | Fischer | G06F 16/93 |
| | | | 715/234 |
| 2015/0378971 A1* | 12/2015 | Fischer | G06F 40/143 |
| | | | 715/227 |
| 2016/0124936 A1 | 5/2016 | Wang et al. | |
| 2017/0322930 A1* | 11/2017 | Drew | G06F 16/338 |
| 2018/0260469 A1 | 9/2018 | Paris et al. | |

OTHER PUBLICATIONS

U.S. Appl. No. 11/150,070, "Non-Final Office Action", dated Sep. 6, 2007, 17 pages.
U.S. Appl. No. 15/677,457, "Final Office Action", dated Jul. 11, 2019, 11 pages.
U.S. Appl. No. 15/677,457, "Non-Final Office Action", dated Jan. 4, 2020, 12 pages.
U.S. Appl. No. 15/677,457, "Non-Final Office Action", dated Nov. 2, 2018, 13 pages.
U.S. Appl. No. 15/677,457, "Notice of Allowance", dated Apr. 28, 2021, 8 pages.

* cited by examiner

100

```
┌─────────────────────────────────────────────────────────────────────┐
│   RECEIVE INFORMATION INDICATING A FIRST DOCUMENT AND A SECOND DOCUMENT │
│                                  102                                │
└─────────────────────────────────────────────────────────────────────┘
                                    ↓
┌─────────────────────────────────────────────────────────────────────┐
│            GENERATE A FIRST TOKEN LIST AND A SECOND TOKEN LIST      │
│                                  104                                │
└─────────────────────────────────────────────────────────────────────┘
                                    ↓
┌─────────────────────────────────────────────────────────────────────┐
│     FORM TOKEN GROUPS FOR EACH OF THE FIRST DOCUMENT AND THE SECOND DOCUMENT │
│                                  106                                │
└─────────────────────────────────────────────────────────────────────┘
                                    ↓
┌─────────────────────────────────────────────────────────────────────┐
│   GENERATE TOKEN MAPS FOR EACH OF THE FIRST DOCUMENT AND THE SECOND DOCUMENT │
│                                  108                                │
└─────────────────────────────────────────────────────────────────────┘
                                    ↓
┌─────────────────────────────────────────────────────────────────────┐
│ GENERATE DIFFERENCE INFORMATION IDENTIFYING DIFFERENCES BETWEEN THE FIRST TOKEN │
│                     LIST AND THE SECOND TOKEN LIST                  │
│                                  110                                │
└─────────────────────────────────────────────────────────────────────┘
                                    ↓
┌─────────────────────────────────────────────────────────────────────┐
│ GENERATE A GROUP MAPPING BETWEEN THE FIRST TOKEN GROUPS AND THE SECOND TOKEN │
│              GROUPS BASED ON THE DIFFERENCE INFORMATION             │
│                                  112                                │
└─────────────────────────────────────────────────────────────────────┘
                                    ↓
┌─────────────────────────────────────────────────────────────────────┐
│  PERFORM PROCESSING DESCRIBED IN FIG. 1B FOR EACH MARKER IN THE FIRST DOCUMENT │
│                                  114                                │
└─────────────────────────────────────────────────────────────────────┘
```

First Document:
I stopped by the typewriter store after work.
stopped

"The quick brown fox jumped over the lazy dogs," I tapped.

I'll take this one," I told the clerk.

"There's nothing for sale here," he replied. "This is a museum!"

220

Second Document:
I stopped by the computer store after work

I tested one of the laptops.

"The quick orange fox jumped over the lazy squirrel," I tapped.

"I'll take this one," I told the clerk.

"That's an excellent choice!" he replied.

First Token List:
i          brown      take       sale
stopped    fox        this       here
by         jumped     one        he
the        over       i          replied
typewriter the        told       this
store      lazy       the        is
after      dogs       clerk      a
work       i          theres     museum
the        tapped     nothing
quick      ill        for

320 —

First HTML Document: <p> I stopped by the typewriter store after work. </p><p> "The quick brown fox jumped over the lazy dogs." I tapped. </p><p> "I'll take this one," I told the clerk. </p> "There's nothing for sale here," he replied. "This is a museum!" </p>

330 —

First Token Map: (1 1), (2 1), (3 1), (4 1), (5 1), (6 1), (7 1), (8 1), (9 2), (10 2), (11 2), (12 2), (13 2), (14 2), (15 2), (16 2), (17 2), (18 2), (19 2), (20 3), (21 3), (22 3), (23 3), (24 3), (25 3), (26 3), (27 3), (28 4), (29 4), (30 4), (31 4), (32 4), (33 4), (34 4), (35 4), (36 4), (37 4), (38 4)

FIG. 3

410 — Second Token List:

| | | |
|---|---|---|
| i | the | told |
| stopped | one | the |
| by | of | squirrel | clerk |
| the | lazy | i | thats |
| computer | the | tapped | an |
| store | laptops | the | excellent |
| after | quick | ill | choice |
| work | orange | take | he |
| i | fox | this | replied |
| tested | jumped | one | |
| | over | i | |

420 — Second HTML Document: `<p>`I stopped by the computer store after work.`</p><p>`I tested one of the laptops.`</p><p>`. "The quick orange fox jumped over the lazy squirrel," I tapped.`</p><p>` "I'll take this one," I told the clerk.`</p><p>`"That's an excellent choice!" he replied.`</p>`

430 — Second Token List: (1 1), (2 1), (3 1), (4 1), (5 1), (6 1), (7 1), (8 1), (9 2), (10 2), (11 2), (12 2), (13 2), (14 2), (15 3), (16 3), (17 3), (18 3), (19 3), (20 3), (21 3), (22 3), (23 3), (24 3), (25 3), (26 4), (27 4), (28 4), (29 4), (30 4), (31 4), (32 4), (33 4), (34 5), (35 5), (36 5), (37 5), (38 5), (39 5)

```
RECEIVE A TOKEN
510
```

```
DETERMINE A FIRST UNIQUE IDENTIFICATION OF THE TOKEN BASED ON A
LOCATION OF THE TOKEN IN A DOCUMENT
520
```

```
DETERMINE A SECOND UNIQUE IDENTIFICATION OF THE TOKEN BASED ON
A TOKEN GROUP THAT INCLUDES THE TOKEN
530
```

```
GENERATE A TOKEN MAP ENTRY TO BE INCLUDED IN A TOKEN MAP FOR
THE TOKEN USING THE FIRST UNIQUE IDENTIFICATION AND THE SECOND
UNIQUE IDENTIFICATION
540
```

FIG. 5

```
                 610       612      614
                 $ diff /tmp/v1.txt  /tmp/v2.txt
                 5c5
                 < typewriter
                                     616
                 ---
                 > computer          618
                 8a9, 14
                 > I                 620
                 > tested
                 > one              622
                 > of
                 > the
                 > laptops
                 11c17
                 < brown
                 ---
         630     > orange
                 17c23
                 < dogs
                 ---
                 > squirrel
                 28, 32c34, 37
                 < theres
                 < nothing
                 < for
                 < sale
                 < here
                 ---
                 > thats
                 > an
                 > excellent
                 > choice
                 35, 38d39
                 < this
                 < is          624
                 < a
                 < museum
```

FIG. 6

810 — I stopped by the computer store after work. —850→ I stopped by the computer store after work.

820 — I tested one of the laptops. —860→ I tested one of the laptops

830 — "The quick orange fox jumped over the lazy squirrel," I tapped. —870→ "That's an excellent choice!" he replied.

840 — "I'll take this one," I told the clerk. —880→ "I'll take this one," I told the clerk.

FIG. 8

I stopped by the computer store after work.
I tested one of the laptops.
"The quick orange fox jumped over the lazy squirrel," I tapped.
"I'll take this one," I told the clerk.
I stopped by the computer store after work.
I tested one of the laptops.
"I'll take this one," I told the clerk.
"That's an excellent choice!" he replied.
FIG. 9A I stopped by the computer store after work.

I tested one of the laptops.

"I'll take this one," I told the clerk.

"That's an excellent choice!" he replied.

— 940

I stopped by the computer store after work.

I tested one of the laptops.

"The quick orange fox jumped over the lazy squirrel," I tapped.

"I'll take this one," I told the clerk.

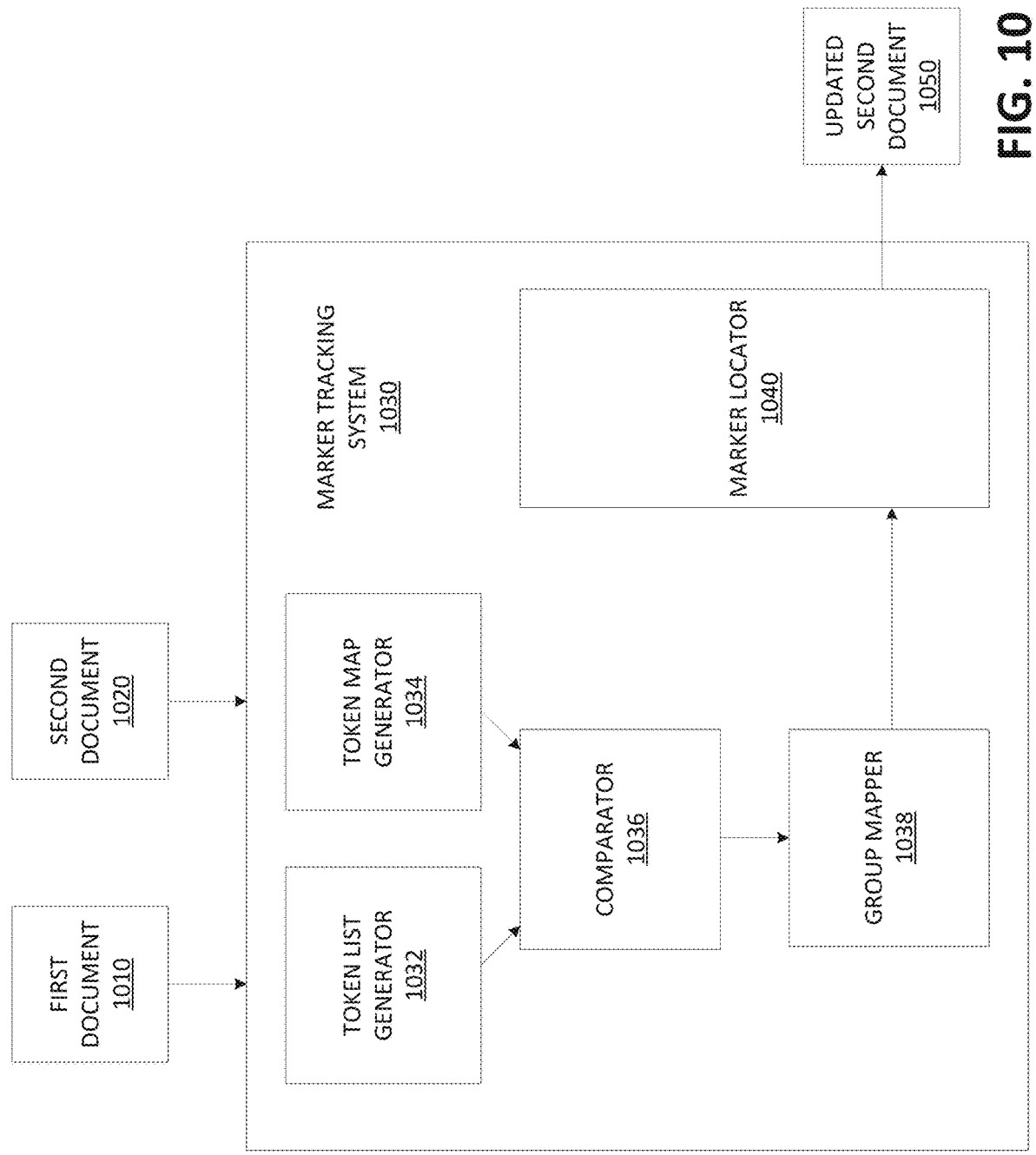

1110 — Search Term Token List:
quick
brown
fox

1120 — Search Term HTML Document: <li> quick brown fox </li>

1130 — Search Term Token Map: (1 1), (2 1), (3 1)

Document Token List:
i
stopped
by
the
typewriter
store
after
work
the
quick
brown
fox
jumped
over
the
lazy
dogs
i
tapped
ill
take
this
one
i
told
the
clerk
theres
nothing
for
sale
here
he
replied
this
is
a
museum

1220

HTML Document: <p>I stopped by the typewriter store after work.</p><p>"The quick brown fox jumped over the lazy dogs." I tapped </p><p> "I'll take this one," I told the clerk.</p>"There's nothing for sale here," he replied. "This is a museum!"</p>

1230

Document Token Map: (1 1), (2 1), (3 1), (4 1), (5 1), (6 1), (7 1), (8 1), (9 2), (10 2), (11 2), (12 2), (13 2), (14 2), (15 2), (16 2), (17 2), (18 2), (19 2), (20 3), (21 3), (22 3), (23 3), (24 3), (25 3), (26 3), (27 3), (28 4), (29 4), (30 4), (31 4), (32 4), (33 4), (34 4), (35 4), (36 4), (37 4), (38 4)

FIG. 12

```
$ diff  /tmp/search_term.txt/   tmp/doc.txt
        0a1,9              3a13, 38           > this       > here
        > i                > jumped           > one        > he
        >                  > over             > i          > replied
        stopped            > the              > told       > this
        > by               > lazy             > the        > is
        > the              > dogs             > clerk      > a
        >                  > i                > theres     >museum
        >typewriter        > tapped           > nothing
        > store            > ill              > for
        > after            > take             > sale
        > work
        > the
```

FIG. 13

TECHNIQUES FOR DOCUMENT MARKER TRACKING

CROSS-REFERENCE TO RELATED APPLICATIONS

The present application is a continuation of, and claims the benefit and priority to U.S. application Ser. No. 15/677,457, filed Aug. 15, 2017, entitled "TECHNIQUES FOR DOCUMENT MARKER TRACKING", now U.S. Pat. No. 11,106,867, the entire contents of which is incorporated herein by reference for all purposes.

BACKGROUND

The present disclosure relates to document processing, and more particularly to techniques that enable markers to be tracked and placed between different documents, such as different versions of a document.

Today, there are numerous tools that allow a user to add markers (e.g., a comment, a highlight, an HTML tag, or other item associated with content of a document) to a document. However, when a document is separately modified by multiple people, there is a need for the markers to be kept in new versions of the document and for them to be properly relocated in appropriate locations in the new versions. Further, there is a need for this to be done automatically without laborious manual intervention.

One approach in the past has been to, for a marker in one version of a document, extract text near the marker, then search for that text in the other version of the document where the marker is to be placed. However, this approach failed when there were changes to the other version of the document that removed the extracted text.

BRIEF SUMMARY

The present disclosure relates to document processing, and more particularly to techniques that enable markers to be tracked and placed between different documents, such as different versions of a document.

According to certain embodiments, techniques are described for adding a marker (e.g., a comment, a highlight, an HTML tag, or other item associated with content of a document) to a second document, the marker corresponding to a marker in a first document. For example, the first document may be a particular version of a document with the marker and the second document may be a different version of the document without the marker.

In certain embodiments, the document marker tracking process may include identifying a token in a first document associated with a marker based upon a location of the marker in the first document. The token may be a contiguous sequence of elements, where each element is one or more characters (including letters, numerical digits, punctuation marks, etc.), one or more words, one or more graphical elements (e.g., an image or a video), or combinations thereof.

The document marker tracking process may further include identifying a particular token group that the token belongs to. The particular token group may be identified from a set of token groups for the first document. A particular token group from a set of token groups for the second document is then identified for the particular token group in the first document. A location for placing the marker in the second document is identified based upon the location of the particular token group in the second document. The marker is then placed in the second document at the identified location.

Various inventive embodiments are described herein, including methods, systems, non-transitory computer-readable storage memory storing code, instructions, or programs executable by one or more processors, and the like, for performing document marker tracking. For example, a method may include receiving information identifying a first document and a second document, the first document including a first marker (e.g., a comment, a highlight, an HTML, tag, or other item associated with one or more tokens within the first document) located at a first location in the first document. In some embodiments, the first document may be one version of a document. In such embodiments, the second document may be another version of the document.

In some embodiments, the first document may be formatted according to a markup language. In such embodiments, the method may further include identifying a set of opening markup tags and a set of corresponding closing markup tags in the contents of the first document. Based on the set of opening markup tags and the set of corresponding closing markup tags, the first document may be divided into sets of token groups. Contents of the first document between an opening markup tag from the set of opening markup tags and a corresponding closing markup tag from the set of corresponding closing markup tags from a token group may be within the first set of token groups.

The method may further include identifying, based upon the first location of the first marker in the first document, a first token (e.g., a word) from a first list of tokens for the first document. The method may further include identifying, from a first set of one or more token groups generated for the first document based upon contents of the first document, a first token group that includes the first token.

The method may further include identifying, from a second set of one or more token groups generated for the second document based upon contents of the second document, a second token group based on the first token group. In some embodiments, identifying the second token group includes determining, based upon a group mapping, that the second token group for the second document corresponds to the first token group for the first document, the group mapping identifying mappings between token groups in the first set of token groups and token groups in the second set of token groups. The group mapping may be generated by determining differences between tokens.

In other embodiments, identifying the second token group includes determining, based upon a group mapping, that the first token group does not have a corresponding token group in the second set of token groups, the group mapping identifying mappings between token groups in the first set of token groups and token groups in the second set of token groups. In such embodiments, identifying the second token group may further include identifying a third token group from the first set of token groups and determining, based upon the group mapping, that the second token group in the second set of token groups corresponds to the third token group.

In some embodiments, identifying the third token group may include identifying another token group in the first set of token groups that is located adjacent to the location of the first token group in the first document and determining, based upon the group mapping, whether the another token group has a corresponding token group in the second set of token groups. In such embodiments, identifying the third token group may further include determining, based upon the group mapping, that the another token group does not have a corresponding token group in the second set of token groups, identifying yet another token group in the first set of token groups that is located adjacent to the location of the first token group in the first document, and determining, based upon the group mapping, whether the yet another token group has a corresponding token group in the second set of token groups.

The method may further include determining a location of the second token group within the second document. The method may further include adding a second marker to the second document at a location based upon the location of the second token group within the second document.

The techniques described herein are not limited to two documents. In alternative embodiments, more than two documents may be processed using the teachings described herein. The foregoing, together with other features and embodiments will become more apparent upon referring to the following specification, claims, and accompanying drawings.

BRIEF DESCRIPTION OF THE DRAWINGS

Illustrative embodiments are described in detail below with reference to the following figures:

FIGS. 1A and 1B illustrate simplified flowcharts depicting processing performed during document marker tracking and processing according to certain embodiments;

FIG. 2 depicts two documents that may be identified according to certain embodiments;

FIG. 3 depicts an example token list, HTML document, and token map for a first document;

FIG. 4 depicts an example token list, HTML document, and token map for a second document;

FIG. 5 illustrates a simplified flowchart depicting a process for generating a token map according to certain embodiments;

FIG. 6 illustrates an example of an output of a comparison tool used with a first token list for a first document and a second token list for a second document according to certain embodiments;

FIGS. 7 and 8 depict visual representations of group mapping information according to certain embodiments;

FIGS. 9A and 9B depict markers added to a second document according to certain embodiments;

FIG. 10 illustrates an example of a marker tracking system for performing document marker tracking and placement according to certain embodiments;

FIG. 11 depicts an example token list, HTML document, and token map for a search term;

FIG. 12 depicts an example token list, HTML document, and token map for a document;

FIG. 13 illustrates an example of an output of a comparison tool used with a first token list for a search term and a second token list for a document according to certain embodiments;

DETAILED DESCRIPTION

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration. Any embodiment or design described herein as "example" or "exemplary" is not necessarily to be construed as preferred or advantageous over other embodiments or designs.

The present disclosure relates to document processing, and more particularly to techniques that enable markers to be tracked and placed between different documents, such as different versions of a document.

According to certain embodiments, techniques are described for adding a marker (e.g., a comment, a highlight, an HTML tag, or other item associated with content of a document) to a second document, the marker corresponding to a marker in a first document. For example, the first document may be a particular version of a document with the marker and the second document may be a different version of the document without the marker.

In certain embodiments, the document marker tracking process may include identifying a token in a first document associated with a marker based upon a location of the marker in the first document. The token may be a contiguous sequence of elements, where each element is one or more characters (including letters, numerical digits, punctuations), one or more words, one or more graphical elements (e.g., an image or a video), or combinations thereof.

The document marker tracking process may further include identifying a particular token group that the token belongs to. The particular token group may be identified from a set of token groups for the first document. A particular token group from a set of token groups for the second document is then identified for the particular token group in the first document. A location for placing the marker in the second document is identified based upon the location of the particular token group in the second document. The marker is then placed in the second document at the identified location.

Figure 1B:
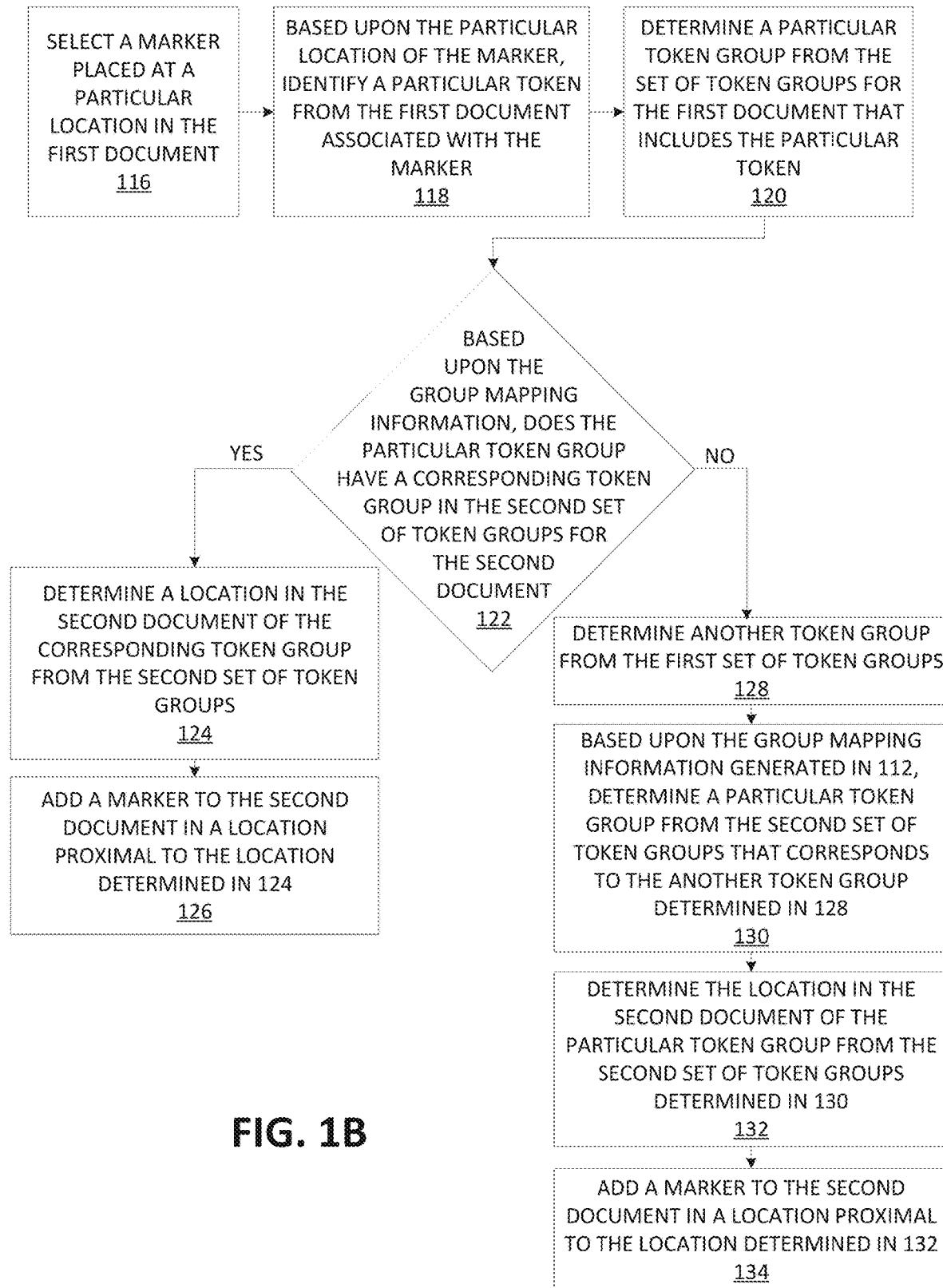

FIGS. 1A and 1B illustrate simplified flowcharts depicting processing performed during document marker tracking and placing according to certain embodiments. The processing depicted in FIG. 1A may be implemented in software (e.g., code, instructions, program) executed by one or more processing units (e.g., processors, cores, or the like) of the respective systems, hardware, or combinations thereof. The software may be stored on a non-transitory storage medium (e.g., on a memory device). The method presented in FIG. 1A, and described below, is intended to be illustrative. The particular series of processing steps depicted in FIG. 1A is not intended to be limiting. In certain alternative embodiments, the steps may be performed in some different order or some steps may also be performed in parallel. In certain embodiments, such as in the embodiment depicted in FIG. 10, the processing depicted in FIG. 1A may be performed by marker tracking system 1030. The processing depicted in FIG. 1A will be explained with reference to examples depicted in FIGS. 2, 3, 4, 6, 7, 8, and 9.

In some examples, the processing depicted in FIG. 1A may be initiated at 102, when information is received identifying documents that are to be inputs for the document marker tracking and placing processing. For example, in 102, information may be received identifying a first document and a second document, where one or more markers from the first document are to be placed in the second document. In some examples, the documents identified in 102 may be different versions of a document. For example, the first document may be one version of a document and the second document may be another version of the document, where there are at least some differences between the contents of the two versions of the document.

While FIG. 1A and the accompanying description may refer to two documents, this is not intended to be limiting. In alternative embodiments, more than two documents may be processed. For example, in certain embodiments, one source document and multiple target documents may be received as input, where markers from the source document are to be placed in the target documents.

FIG. 2 depicts two documents 210 and 220 that may be identified in 102. The contents of these documents are also shown in FIG. 2. While not shown in FIG. 2, the documents may also have markers associated with them at different locations within the documents.

Referring back to FIG. 1A, at 104, a first token list is generated based upon the contents of the first document, and a second token list is generated based upon the contents of the second document. A token may be a contiguous sequence of elements, where an element may be one or more characters (including letters, numerical digits, and/or punctuation marks), one or more words, one or more graphical elements (e.g., an image or a video), or combinations thereof.

As part of 104, the contents of the first document are subjected to tokenization processing that outputs tokens that are included in the first token list. Likewise, the contents of the second document are subjected to tokenization processing that outputs tokens that are included in the second token list. For example, if a token is defined as a word, then the first token list comprises words in the contents of the first document and the second token list comprises words in the contents of the second document.

For the example document 210 depicted in FIG. 2, FIG. 3 depicts a sample token list 310 generated based upon the contents of document 210. For the example document 220 depicted in FIG. 2, FIG. 4 depicts a sample token list 410 generated based upon the contents of document 220. For the examples in FIGS. 3 and 4, it is assumed that each word in the documents is considered a token. In addition, it is assumed that only words are tokens in FIGS. 3 and 4. In other embodiments, other tokens (such as punctuation marks) may be considered separate tokens (or included in a token with an adjacent word) in addition to words. While the examples in FIGS. 3 and 4 depict separate columns in sample token lists 310 and 410, it should be recognized that the format of a sample token list may be different.

At 106, one or more token groups are determined for each of the first and second documents. For example, a first set of token groups is determined for the first document, and a second set of token groups is determined for the second document. A token group may include one or more tokens that are contiguously or consecutively located within a portion of a document (e.g., tokens that are next to each other in the contents of the document). Different portions may be used in different embodiments. For example, a portion may be a sentence, a paragraph, or some other portion.

There are many ways to generate token groups for a document based upon the tokens identified in the document's contents. In one illustrative example, the document may be converted to a document in a markup language format (e.g., Hyper Text Markup Language (HTML), Extensible Markup Language (XML), or the like). For example, the document may be converted to an HTML document. As a result of this conversion, tags (e.g., HTML opening and closing tags) are inserted in the document to demarcate lines (HTML tag: <br>), paragraphs (HTML tag: <p>), sections (HTML tags: <div>, <span>), cells in a table (HTML tag: <td>), rows in a table (HTML tag: <tr>), figures, (HTML tag: <figure>), and others. These HTML tags may then be used for forming groups of tokens. For example, in one instance, all tokens occurring between a particular type of opening HTML tag (e.g., < >) and a corresponding closing HTML tag (i.e., </>) are indicated as belonging to one group. In some examples, a group may contain one or more tokens (e.g., a word, a number, an image, or the like).

For example, consider a document whose contents include a single line "Hello world". After converting the document to an HTML document, the following tags may be inserted in the document: "<p>Hello world </p>". The HTML document may then be parsed to identify the HTML tags <p>and </p>, and the tokenized contents between the tags are considered as one group. For example, if tokens are words, the tokens "Hello" and "world" are included in one token group.

As another example, for the example document 210 depicted in FIG. 2, reference 320 in FIG. 3 points to the document after HTML tags have been inserted in the document. The portions of the document between opening <p>and ending </p>represent portions of the document for forming token groups. Thus:

the tokens in—I stopped by the typewriter store after work.—belong to a first token group for document 210, the tokens in—"The quick brown fox jumped over the lazy dogs," I tapped.—belong to a second token group for document 210, the tokens in—"I'll take this one," I told the clerk—belong to a third token group for document 210, and the tokens in—"There's nothing for sale here," he replied. "This is a museum!"—belong to a fourth token group for document 210.

In a similar manner, for the example document 220 depicted in FIG. 2, reference 420 in FIG. 4 points to the document after HTML tags have been inserted in the document. The portions of the document between opening <p>and ending </p>represent portions of the document for forming token groups. Thus:

the tokens in—I stopped by the computer store after work.—belong to a first token group for document 220, the tokens in—I tested one of the laptops.—belong to a second token group for document 220, the tokens in—"The quick brown fox jumped over the lazy squirrel," I tapped.—belong to a third token group for document 220, the tokens in—"I'll take this one," I told the clerk—belong to a fourth token group for document 220, and the tokens in—"That's an excellent choice!" he replied.—belong to a fifth token group for document 220.

At 108, token maps are generated for each of the first and second document based upon the token lists generated in 104 and the sets of token groups generated in 106. For example, a first token map may be generated for the first document based on the first token list and the first set of token groups, and a second token map may be generated for the second document based on the second token list and the second set of token groups.

In certain embodiments, for a document, the token map generated for the document indicates, for each token in the document, (a) information identifying the position of the token in the sequence of tokens in the document, where the sequence is based upon the positions of tokens in the document, and (b) information identifying a token group for the document to which the token belongs (or the token group that includes the token). Accordingly, a token map for a document may, for each token in the document, include a first unique identification relative to the document (e.g., location of the token within the document) and a second unique identification relative to a group (e.g., the second unique identification may indicate a group of tokens that includes the token).

FIG. 3 depicts an example token map 330 generated for document 210. Token map 330 comprises multiple entries, with an entry for each token included in the token list for document 210. The entries are ordered based upon the locations of the tokens in the document. FIG. 4 depicts an example token map 430 generated for document 220. In the embodiments depicted in FIGS. 3 and 4, each entry for a token is in the form (n m), where "n" indicates the position of the token within the sequence of tokens for the document, and "m" identifies the token group that includes that token.

For example, in token map 330 depicted in FIG. 3 for document 210:
(1 1) corresponds to token "I"—($1^{st}$ token in document, belonging to group 1)
(2 1) corresponds to token "stopped"—($2^{nd}$ token in document, belonging to group 1)
(3 1) corresponds to token "by"—($3^{rd}$ token in document, belonging to group 1)
(10 2) corresponds to token "quick"—($10^{th}$ token in document, belonging to group 2)
(38 4) corresponds to token "museum"—($38^{th}$ token in document, belonging to group 1) and so on.

For another example, in token map 430 depicted in FIG. 4 for document 220:
(1 1) corresponds to token "I"—($1^{st}$ token in document, belonging to group 1)
(2 1) corresponds to token "stopped"—($2^{nd}$ token in document, belonging to group 1)
(3 1) corresponds to token "by"—($3^{rd}$ token in document, belonging to group 1)
(10 2) corresponds to token "tested"—($10^{th}$ token in document, belonging to group 2)
(39 5) corresponds to last token "replied"—($39^{th}$ token in document, belonging to group 5) and so on.

FIG. 5 illustrates a simplified flowchart 500 depicting a process for generating a token map according to certain embodiments. The processing depicted in FIG. 5 may be implemented in software (e.g., code, instructions, program) executed by one or more processing units (e.g., processors, cores, or the like) of the respective systems, hardware, or combinations thereof. The software may be stored on a non-transitory storage medium (e.g., on a memory device). The method presented in FIG. 5, and described below, is intended to be illustrative. The particular series of processing steps depicted in FIG. 5 is not intended to be limiting. In certain embodiments, such as in the embodiment depicted in FIG. 10, the processing depicted in FIG. 5 may be performed by marker tracking system 1030.

The processing depicted in FIG. 5 may be performed for each token in a token list generated for a document. For example, the processing in FIG. 5 may be performed for each token in token list 310 depicted in FIG. 3. At 510, a token from a token list is received. It is assumed that the token received in 510 is one for which there is no entry yet in the token map.

At 520, a first unique identification for the token relative to the document is determined. In some examples, the first unique identification may correspond to a location of the token in the document. For example, a first token in the document may be given an identification of one, a second token in the document may be given an identification of two, a third token in the document may be given an identification of three, and so on. In such an example, the numbering may be based on the location of the token in the sequence of tokens in the document. In some examples, the first unique identification for a token may be unique within a document. In some examples, the way in which the numbering is used for the first unique identification may be consistent between documents (e.g., in each document, starting at one and increasing by one for each consecutive token). It should be recognized that the first unique identification may be in different forms in other embodiments.

At 530, a second unique identification for the token is determined. Determining the second unique identification may include determining a token group to which the token received in 510 belongs. In certain embodiments, the second unique identification represents the group of tokens to which the token belongs. For example, if the tokens for a document have been divided into three groups of tokens and if it is determined that the token received in 510 belongs to the third token group, then "3" may be determined in 530 as the second unique identification for the token. In some examples, the second unique identification may be consistent between documents (e.g., in each document, the group numbering starts at one and increases by one for each consecutive group). It should be recognized that the second unique identification may be in different forms in other embodiments.

At 540, a token map entry (e.g., a tuple) to be included in the token map for the document is generated for the token using the first unique identification and the second unique identification. In some examples, the tuple is a list of the first unique identification and the second unique identification. For example, the token map entry for a first token in a document may be the tuple (1 1), where the first number in the tuple represents the first unique identification and the second number in the tuple represents the second unique identification. However, it should be recognized that other identification information may be used in a token map entry for a token in other embodiments.

Referring back to FIG. 1A, at 110, difference information is generated identifying one or more differences between the first token list and the second token list. The difference information indicates whether a token was added, removed, or modified in the second token list relative to the first token list. For example, the difference information may indicate that the first token list includes a token in a position that the second token list does not include. As another example, the difference information may indicate that the second token list includes a token in a position that the first token list does not include. As yet another example, the difference information may indicate that the first token list includes a token in a position that is a modified version of a token in the second token list. Various different tools and techniques may be used to identify the differences between the token lists.

FIG. 6 illustrates an example of an output of a comparison tool used with a first token list for a first document and a second token list for a second document according to certain embodiments. The output identifies one or more differences between the first token list and the second token list. In the example in FIG. 6, the "diff" UNIX utility 610 is used to find differences between a first token list (assumed to be in the form of a text file "v1.txt") and a second token list (assumed to be in the form of a text file "v2.txt"). The diff command is typically invoked from the command line, and takes two files (a first file and a second file) as input parameters. The output of the command represents the changes required to transform the first file into the second file. Further, since diff is a line-based utility, it is assumed that v1.txt file has one token per line in the file and v2.txt has one token per line in the file. While the UNIX diff utility is shown in FIG. 6 and described herein, this is not intended to be limiting. It should be recognized that other methods for identifying differences between token lists (and/or documents) may be used.

In FIG. 6, reference 612 identifies both the name of the file containing the first token list and a location of that file. Likewise, reference 614 identifies both the name of the file containing the second token list and a location of that file. References 612 and 614 are provided as input parameters for the UNIX diff utility. In the example depicted in FIG. 6, it is assumed that the first token list (stored in file "v1.txt") corresponds to token list 310 depicted in FIG. 3 and the second token list (stored in file "v2.txt") corresponds to token list 410 depicted in FIG. 4. The UNIX diff utility may output differences between two documents, as partially shown in top portion 630 in FIG. 6. The output of the UNIX diff utility shows differences using letters: "a" stands for added, "d" stands for deleted, and "c" stands for changed. The line numbers of the first file (in this example of v1.txt containing the first token list) appear before these letters and those of the second file (in this example of v2.txt containing the second token list) appear after the letter.

For example, as depicted in FIG. 6, reference 616 points to a first type of difference where something has changed between two lines in the first and second files. Reference 616 shows "5c5," which indicates that line 5 (i.e., token 5 since the file contains one token per line) has been changed from v1.txt and v2.txt, i.e., token 5 in the first token list is changed to a different token in the second token list. The next section of the output shows the actual lines. Lines preceded by a "<" are lines from the first file "v1.txt," i.e., the first token list. Lines preceded by ">" are lines from the second file "v2.txt," i.e., the second token list. Thus, references 618 "< typewriter" and 620 "> computer" indicate that line 5 in the first file contains "typewriter," which is different from line 5 in the second file that contains "computer". Because the files being compared have one token per line, it essentially indicates that token 5 in the first token list is "typewriter" and this is different from token 5 in the second token list that is "computer". Therefore, references 616, 618, and 620 indicate that token 5 of the first token list was changed from "typewriter" to "computer" in the second token list. The "—" is used to separate the lines of the two files.

As another example, reference 622 points to a second type of difference where some lines have been added to the second file. Reference 622 shows "8*a*9, 14" indicating that, after line 8 in the first file, lines 9-14 from the second file need to be added to the first file to make it the same as the second file. In essence, this indicates that tokens 9-14 are newly added to the second token list after token 8 and were not included in the first token list.

As yet another example, reference 624 points to a third type of difference where something has been deleted from the second file. Reference 624 shows "35, 38*d*39" indicating that lines 35-38 from the first file need to be deleted to match with line 39 of the second file. In essence, this indicates that tokens 35-38, which are present in the first token list, do not appear in the second token list.

In the example depicted in FIG. 6 and described above, the line numbers correspond to token numbers since there is one token per line in both files v1.txt (first token list) and v2.txt (the second token list).

Referring back to FIG. 1A, at 112, a group mapping is generated between the first token groups for the first document and the second token groups for the second document. As part of this processing, for each token group in the first set of token groups for the first document, a corresponding token group, if present, is identified from the second set of token groups. In some embodiments, likewise, for each token group in the second set of token groups for the second document, a corresponding token group, if present, is identified from the first set of token groups. For two corresponding token groups, as part of 112, a determination is also made if the token groups are the same (i.e., contain the same tokens in the same order) or different (contains different tokens or in different order). The processing in 112 may yield one of the following results:

(a) A token group in the first set of token groups for the first document has a corresponding token group in the second set of token groups for the second document, and the corresponding token groups are the same (i.e., the corresponding token groups contain the same tokens in the same order);

(b) A token group in the first set of token groups for the first document has a corresponding token group in the second set of token groups for the second document, but the corresponding token groups are different (i.e., either the tokens or the ordering of the tokens in the corresponding token groups is different);

(c) A token group in the first set of token groups for the first document has no corresponding token group in the second set of token groups for the second document; or (d) A token group in the second set of token groups for the second document has no corresponding token group in the first set of token groups for the first document.

For example, a group mapping for the two documents may be represented as following:

(1 1 diff) (n/a 2 add) (2 3 diff) (3 4 same) (4 5 diff) etc. where (1 1 diff) indicates that token group 1 from the first set of token groups for the first document corresponds to token group 1 from the second set of token groups for the second document but the two groups are different, (n/a 2 add) indicates that token group 2 from the second token groups for the second document has been added to the second document and does not have any corresponding token group in the first set of token groups for the first document, (2 3 diff) indicates that token group 2 from the first set of token groups for the first document corresponds to token group 3 in the second set of token groups for the second document and the two groups are different (e.g., token group 3 is a modified version of token group 2 of the first token groups), (3 4 same) indicates that token group 3 of the first token groups for the first document corresponds to and is the same as token group 4 of the second token groups for the second doc, and (4 5 diff) indicates that token group 4 from the first set of token groups for the first document corresponds to token group 5 in the second set of token groups for the second document and the two groups are different (e.g., token group 5 of the second token groups is a modified version of token group 4 of the first token groups).

Figure 7:
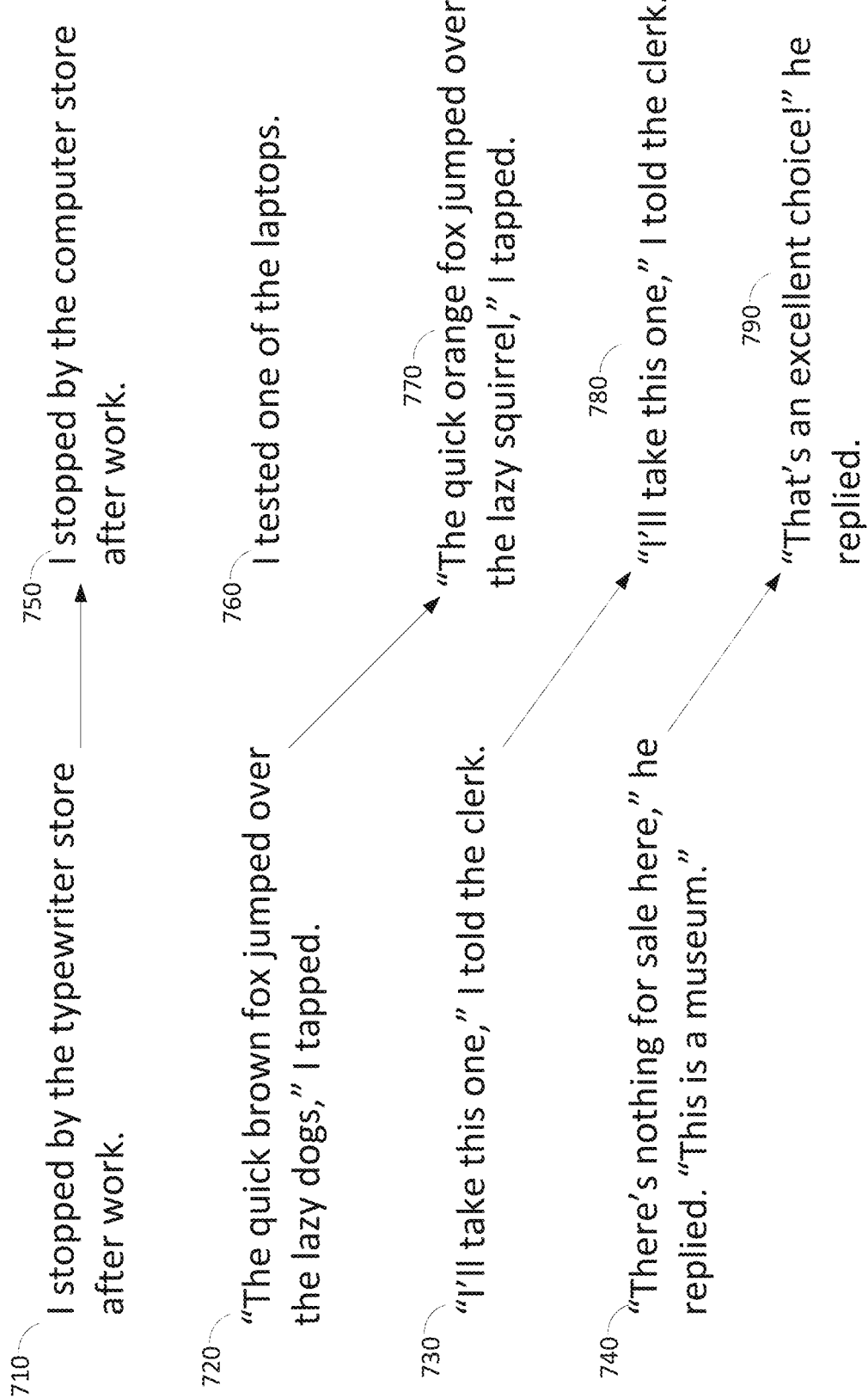

FIGS. 7 and 8 depict visual representations of group mapping information according to certain embodiments. For example, FIG. 7 includes first token group 710 from a first document that corresponds to a second token group 750 from a second document. As can be seen, the two token groups do not exactly match. In particular, first token group 710 includes the word "typewriter" while second token group 750 includes the word "computer." While the differences between these two token groups is minimal, more differences may be included and still have token groups correspond to each other. For example, fourth token group 740 from the first document is determined to correspond to ninth token group 790 from the second document. And as can be seen, the only similarities between the token groups is the quotation marks and "he replied." Accordingly, a system can be configured to determine how similar two token groups need to be to be determined to correspond.

FIG. 7 also illustrates when a token group from a document does not have a corresponding token group in the other document. For example, sixth token group 760 from the second document does not correspond to a token group from the first document. This is shown by their not being an arrow from a token group of the first document to sixth token group 760.

FIG. 8 illustrates when there are token groups from a first document that do not correspond to a token group from a second document. For example, fifth token group 830 does not have a token group from the second document that corresponds to it (as illustrated in FIG. 8).

Accordingly, there is not an arrow from fifth token group 830 to a token group from the second document. FIG. 8 also illustrates some token groups from the first document that do have a corresponding token group from the second document. For example, first token group 810 from a first document may be determined to correspond to second token group 850 from a second document.

The group mapping information generated in 112 is used to determine where markers from the first document are to be placed within the second document as described below in further detail with respect to FIG. 1B.

FIG. 1B illustrates a simplified flowchart depicting processing performed for each marker in a first document during document marker tracking according to certain embodiments. FIG. 1B may be an expansion of FIG. 1A. For example, FIG. 1B may be an expansion of 114 in FIG. 1A. The processing depicted in FIG. 1B may be implemented in software (e.g., code, instructions, program) executed by one or more processing units (e.g., processors, cores, or the like) of the respective systems, hardware, or combinations thereof. The software may be stored on a non-transitory storage medium (e.g., on a memory device). The method presented in FIG. 1B, and described below, is intended to be illustrative. The particular series of processing steps depicted in FIG. 1B is not intended to be limiting. In certain alternative embodiments, the steps may be performed in some different order or some steps may also be performed in parallel. In certain embodiments, such as in the embodiment depicted in FIG. 10, the processing depicted in FIG. 1B may be performed by marker tracking system 1030.

In some examples, the processing depicted in FIG. 1B may be initiated at 116, when a marker is selected that is placed at a particular location in the first document. At 118, a particular token from the first document may be identified that is associated with the marker based upon the particular location of the marker. At 120, a particular token group that includes the particular token is determined. The particular token group may be from the set of token groups for the first document.

At 122, based upon the group mapping information generated in 112, a determination may be made whether the particular token group determined in 120 has a corresponding token group in the second set of token groups for the second document. At 124, if the determination results in a yes, a location in the second document of the corresponding token group from the second set of token groups is determined. At 126, a marker is added to the second document in a location proximal to the location determined in 124.

FIG. 9A depicts an example of marker 920 added to a second document according to certain embodiments. In particular, marker 910 may be included in a first document. Marker 910 may be associated with a token "I," which belongs to a second token group from the first document. For example, the second token group may be "I tested on of the laptops." Based on the description above, it may be determined that the second token group from the first document corresponds to a second token group from the second document. Based on the correspondence, marker 920 may be added to the second document at a place proximally located to the second token group from the second document.

Referring back to FIG. 1B, at 128, if the particular token group does not have a corresponding token group in the second set of token groups, another token group is determined from the first set of token groups that is proximally located within the first document to the particular token group determined in 120 and which has a corresponding token group in the second set of token groups for the second document. At 130, based upon the group mapping information generated in 112, a particular token group is determined from the second set of token groups that corresponds or maps to the another token group determined in 128. At 132, a location in the second document is determined for the particular token group from the second set of token groups determined in 130. At 134, a marker is added to the second document in a location proximal to the location determined in 132.

FIG. 9B illustrates an example of marker 940 added to a second document according to certain embodiments. In particular, marker 930 may be included in a first document. Marker 930 may be associated with a token "The," which belongs to a third token group from the first document. For example, the third token group may be "'The quick orange fox jumped over the lazy squirrel,' I tapped." Based on the description above, it may be determined that the third token group from the first document does not correspond to a token group from the second document.

Instead, a different token group from the first document may be used to correspond to a token group in the second document. For example, a second token group from the first document (i.e., "I tested one of the laptops.") may be selected as being proximally close to the third token group from the first document. The second token group from the first document may also be determined to correspond to the second token group from the second document. Based on the correspondence, marker 940 may be added to the second document at a place proximally located to the second token group from the second document. In the example depicted in FIG. 9B, marker 940 is placed on the right side of the second token group because the fact that a token group above the token group associated with marker 930 was used. It should be recognized that placement of marker 940 may be based on other factors.

While the example illustrated in FIG. 9B describes using a token group above a token group that is associated with marker 930, it should be recognized that a token group below may be used instead. In addition, one or more token groups adjacent to a token group with the marker from a first document may not have corresponding token groups from a second document. In such examples, a token group from the first document to be used with the document marker tracking and placement may be determined to be multiple token groups away from the token group with the marker from the first document.

FIG. 10 illustrates an example of marker tracking system 1030 for performing document marker tracking and placement according to certain embodiments. Marker tracking system 1030 may include multiple subsystems such as a token list generator subsystem 1032, a token map generator subsystem 1034, a comparator subsystem 1036, a group mapper subsystem 1038, and a marker locator subsystem 1040. Marker tracking system 1030 and its subsystems may be implemented in software, in hardware, or combinations thereof. Marker tracking system 1030 depicted in FIG. 10 is merely an example and is not intended to unduly limit the scope of inventive embodiments recited in the claims. One of ordinary skill in the art would recognize many possible variations, alternatives, and modifications. For example, in some implementations, marker tracking system 1030 may have more or fewer subsystems than those shown in FIG. 10, may combine two or more systems, or may have a different configuration or arrangement of subsystems.

As depicted in FIG. 10, first document 1010 and second document 1020 are provided as inputs to marker tracking system 1030. Marker tracking system 1030 is configured to determine the locations of markers in first document 1010 and place corresponding markers in second document 1020. In some embodiments, first document 1010 and second document 1020 may be different versions of the same document.

In certain embodiments, token list generator 1032 is configured to tokenize the contents of first document 1010 and second document 1020 and generate and output a token list for each of first document 1010 and second document 1020. For example, token list generator may be configured to perform processing depicted in 104 in FIG. 1A. In some examples, token list generator 1032 may store the generated token lists in a memory (not illustrated in FIG. 10) accessible to marker tracking system 330, or may provide the token lists to comparator 1036 for further processing.

In certain embodiments, token list generator 1032 may also determine sets of token groups for first document 1010 and second document 1020. For example, token list generator 1032 may be configured to perform processing depicted in 106 in FIG. 1A. In some examples, token list generator 1032 may store the generated set of token groups in a memory (not illustrated in FIG. 10) accessible to marker tracking system 1030, or may provide the token groups to group mapper 1038 for further processing.

Token map generator 1034 is configured to take first document 1010 and second document 1020 as inputs and output a token map for each of the two documents. For example, token map generator 1034 may be configured to perform processing depicted in 108 in FIG. 1A. In some examples, token map generator 1034 may store the generated token maps in a memory (not illustrated in FIG. 10) accessible to marker tracking system 1030, or may provide the token maps to group mapper 1038 for further processing.

In certain embodiments, comparator 1036 is configured to take the token lists generated by token list generator 1032 for first document 1010 and second document 1020 respectively as inputs and determine one or more differences between the token lists. For example, comparator 1036 may be configured to perform processing depicted in 110 in FIG. 1A. In some examples, the comparator 1036 may take the documents themselves as inputs and determine the differences. In such examples, the differences determined by comparator 1036 may be stored in a memory accessible to marker tracking system 1030 or may be provided to group mapper 1038 for further processing.

Group mapper 1038 is configured to generate a mapping between the token groups generated for first document 1010 and token groups generated for second document 1020. In certain embodiments, group mapper 1038 may take as inputs the results of comparator 336, the set of token groups generated by token list generator 1032, and the token maps generated by token map generator 1034. For example, group mapper 1038 may be configured to perform processing depicted in 112 in FIG. 1A. For example, group mapper 1038 may identify corresponding tokens groups between first document 1010 and second document 1020 and whether the corresponding groups are the same or are modifications of one another. Group mapper 1038 may also identify a group of tokens in first document 1010 that may not have a corresponding group of tokens in second document 1020. Group mapper 1038 may also identify a group of tokens in second document 1020 that may not have a corresponding group of tokens in first document 1010. In some examples, group mapper 1038 may output a group mapping. In such examples, the group mapping may be either provided to marker location 1040 or stored in a memory accessible to marker tracking system 1030 for further processing.

The marker locator 1040 may identify a location of a marker in first document 1010 in relation to second document 1020. The marker locator 1040 may take as input an identification of a location of a marker in a document (e.g., one or more particular tokens that the marker is associated with or a location of a first marker in first document 1010) or the documents themselves. The marker locator 1040 may also take as input the token lists, the token maps, the one or more differences, the group mapping, or any combination thereof. For example, marker locator 1040 may be configured to perform processing depicted in 114 in FIG. 1A (and expanded in FIG. 1B).

The marker locator 1040 may output updated second document 1050. Updated second document 1050 may include differences between first document 1010 and second document 1020 in relation to second document 1020. Updated second document 1050 may also include one or more markers that were located in first document 1010 but not second document 1020.

While the description above describes adding a marker from a first document to a second document, techniques described herein may also be used to search a document for search terms. For example, a search term may be tokenized and compared with the document (similarly as described above between two documents). However, by searching the document using token groups rather than a single search term, search terms with multiple words may be identified in the document even when an exact match is not in the document.

FIG. 11 depicts an example search term token list 1110, search term HTML document 1120, and search term token map 1130 for a file that includes a single search term. Similarly as described above, search term token list 1110 may be generated by tokenizing the file to identify each token in the file. For example, the file may include "quick brown fox," which is intended to be the search term that is used to search the document.

When the file is converted to HTML, search term HTML document 1120 may include "<li> quick brown fox </li>," where <li> and </li> are tags inserted when converted to HTML. The tags may separate different search terms inserted into a list. While FIG. 11 illustrates a single term, it should be recognized that there may be multiple, each term separated by a set of HTML tags.

Search term token map 1130 may be generated similarly to as described above for generating token maps. Accordingly, search term token map 1130 may include three tuples, each tuple associated with a different token in search term token list 1110. In addition, each tuple may include a first unique identification and a second unique identification (as also described above).

FIG. 12 depicts an example document token list 1210, HTML document 1220, and document token map 1230 for a document. The document may be the same document as described above in FIG. 3. In addition, each of document token list 1210, HTML document 1120, and document token map 1230 may be generated in a similar manner as described above.

FIG. 13 illustrates an example of an output of a comparison tool used with a first token list for a search term and a second token list for a document according to certain embodiments. The output identifies one or more differences between the first token list and the second token list. In the example in FIG. 13, the "diff" UNIX utility 1310 is used to find differences between a first token list (assumed to be in the form of a text file "search_term.txt") and a second token list (assumed to be in the form of a text file "doc.txt"). The diff command is typically invoked from the command line, and takes two files (a first file and a second file) as input parameters. The output of the command represents the changes required to transform the first file into the second file. Further, since diff is a line-based utility, it is assumed that search term.txt file has one token per line in the file and doc.txt has one token per line in the file. While the UNIX diff utility is shown in FIG. 13 and described herein, this is not intended to be limiting. It should be recognized that other methods for identifying differences between token lists (and/or documents) may be used.

In FIG. 13, reference 1312 identifies both the name of the file containing the first token list and a location of that file. Likewise, reference 1314 identifies both the name of the file containing the second token list and a location of that file. References 1312 and 1314 are provided as input parameters for the UNIX diff utility. In the example depicted in FIG. 13, it is assumed that the first token list (stored in file "search_term.txt) corresponds to token list 1110 depicted in FIG. 11 and the second token list (stored in file "doc.txt) corresponds to token list 1210 depicted in FIG. 12. The UNIX diff utility may output differences between two documents, as partially shown in top portion 1316 in FIG. 13. The output of the UNIX diff utility shows differences using letters: "a" stands for added, "d" stands for deleted, and "c" stands for changed. The line numbers of the first file (in this example of search text.txt containing the first token list) appear before these letters and those of the second file (in this example of doc.txt containing the second token list) appear after the letter.

For example, as depicted in FIG. 13, the first entry (e.g., "0*a*1,9") in the output indicates where some lines have been added to the second file. "0*a*1,9" may indicate that, after line 0 in the first file, lines 1-9 from the second file need to be added to the first file to make it the same as the second file. In essence, this indicates that tokens 1-9 are newly added to the second token list after token 0 and were not included in the first token list.

In the example depicted in FIG. 13 and described above, the line numbers correspond to token numbers since there is one token per line in both files search_term.txt (first token list) and doc.txt (the second token list).

Figure 14:
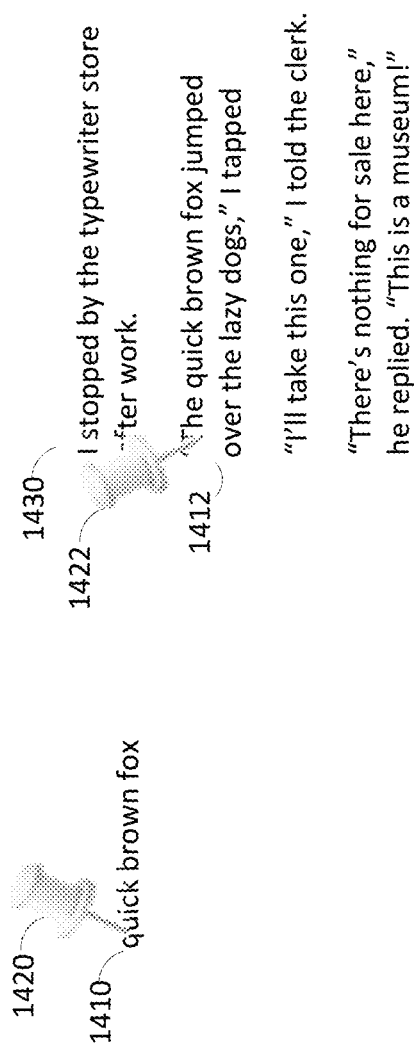
FIGS. 14 and 15 depict markers added to a document according to certain embodiments.

FIG. 14 depicts adding marker 1422 to a second document based on a search term (e.g., "quick brown fox") located in a first document. To locate a position to add market 1422, the first document may include a marker 1420 that is placed in a location associated with the search term.

By placing marker 1420 on the search term, a searching system (e.g., the searching system 1630 described in FIG. 16) may identify a group (e.g., first group 1410) from the first document that the marker 1420 is associated with. When there is only one search term, the group identified by the searching system would be the only group.

The searching system may identify a group in the second document that includes the search term. For example, the searching system may identify that a first group 1430 of the second document does not include the search term and that a second group 1412 of the second document does include the search term. In such an example, the searching system may place marker 1422 at a location proximate to the second group 1412 because it has been identified that the second group 1412 corresponds to the first group 1310 from the first document. In some examples, more than one group in the second document may be identified, each group having a marker added to the second document.

Figure 15:
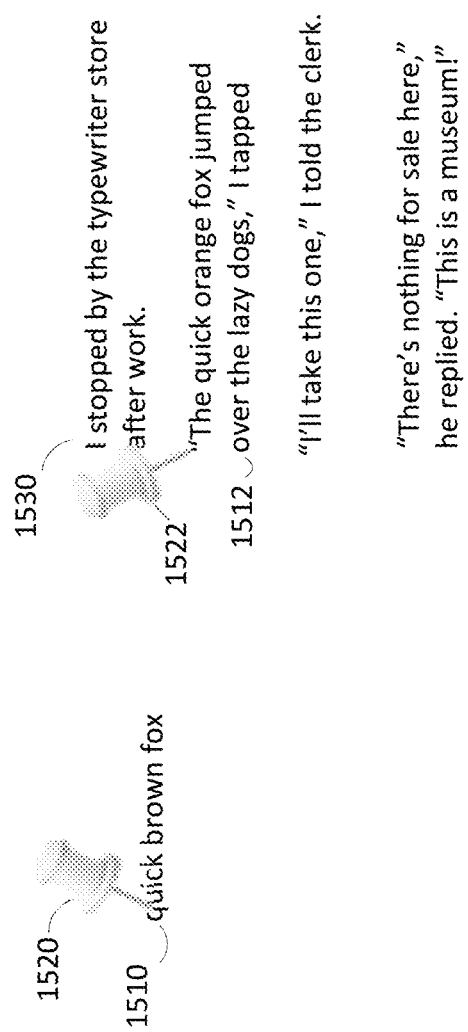

FIG. 15 depicts adding marker 1522 to a second document based on a search term (e.g., "quick brown fox") located in a first document. Similar to FIG. 14, a searching system may identify the search term in the first document, determine a token group from the first document that includes the search term, divide the second document into multiple token groups, and search compare the token group from the first document to token groups from the second document to identify matches.

Because the searching system is comparing token groups, the second document may identify a group from the second document that includes "quick orange fox" rather than "quick brown fox" because of the similarity of the two token groups (i.e., both token groups include "quick" and "fox"). Accordingly, the searching system may place marker 1522 on second group 1512 of the second document because it has been determined that group 1510 from the first document, which includes the search term, corresponds to second group 1512 of the second document.

Figure 16:
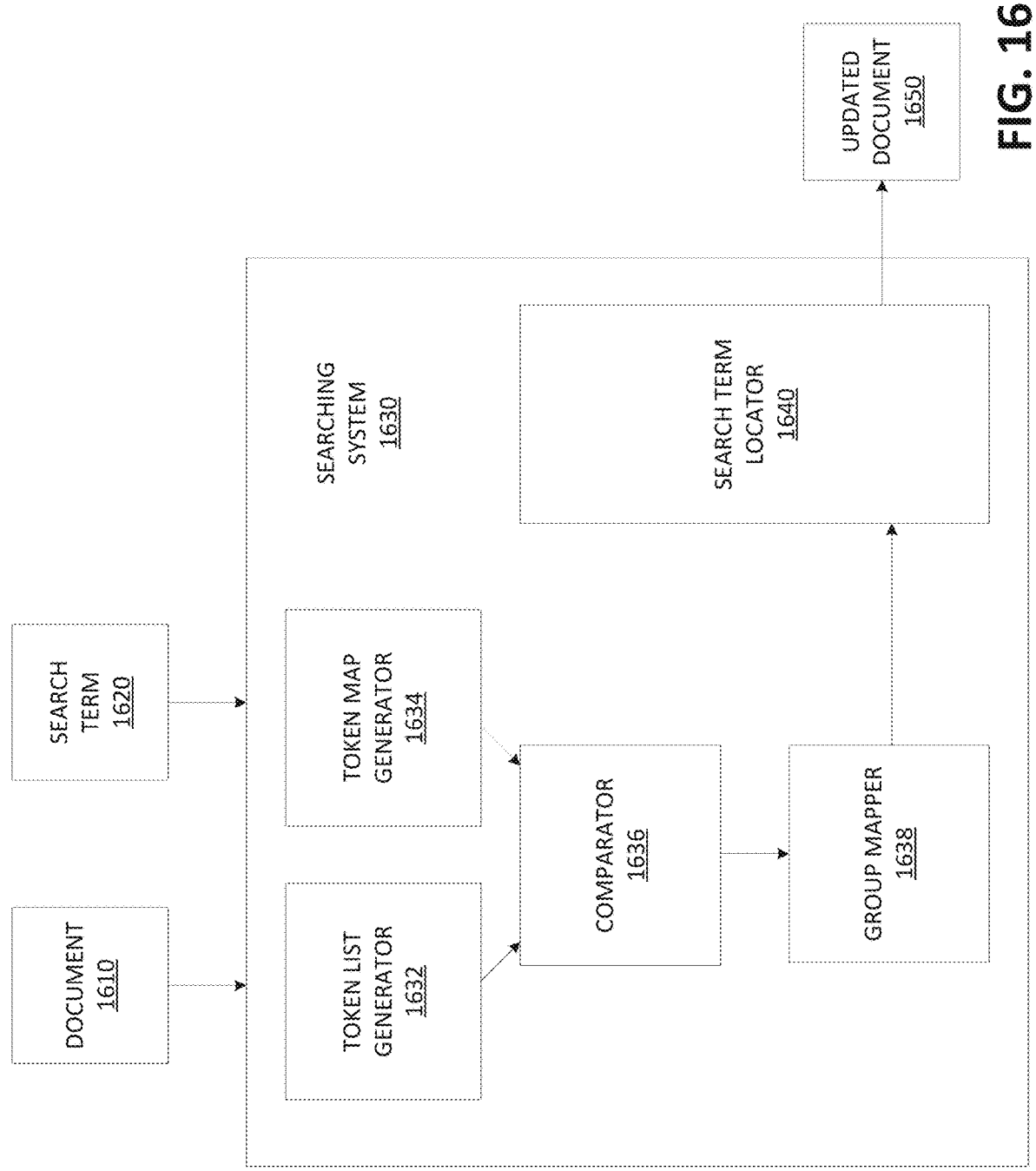
FIG. 16 illustrates an example of a searching system according to certain embodiments.

FIG. 16 illustrates an example of searching system 1630 according to certain embodiments. Searching system 1630 may utilize group mapper 1638 (similar to group mapper 1038 described above) to identify one or more locations of one or more search terms (e.g., search term 1620) in document 1610. Searching system 1630 may include token list generator 1632, token map generator 1634, comparator 1636, group mapper 1638, search term locator 1640, or any combination thereof. Token list generator 432 and token map generator 1634 may operate similarly to token list generator 1032 and token map generator 1034 described above. For example, token list generator 1632 may produce a token list as illustrated in FIG. 11 at reference number 1120. Token map generator 1634 may produce a token map as illustrated in FIG. 11 at reference number 1130. In some examples, token list generator 1632 and/or the token map generator 434 may operate on a document that has been converted into HTML (as illustrated by reference number 1110 in FIG. 11).

Comparator 1636 may compare a token list generated for search term 1620 and a token list generated for document 1610 (as illustrated in FIG. 16). In some examples, the difference may identify one or more groups that have been added, modified, or removed from search term 1620 based on document 1610. The difference may also identify one or more groups that have been added, modified, or removed from document 1610 based on the search term 1620. The identified groups may either be provided to the group mapper 1638 or stored in the memory of the searching system 1630.

Group mapper 1638 may map each group of search term 1620 with one or more groups of document 1610. The one or more groups of document 1610 may be groups that have search term 1620. Search term locator 1640 may generate updated document 1650 that highlights the one or more groups that were identified as having the search term 1620 based on the output of group mapper 1638. In some embodiments, a single marker associated with search term 1620 may produce multiple markers in document 1610 when search term 1620 (or a similar term) is repeated multiple times in document 1610.

Figure 17:
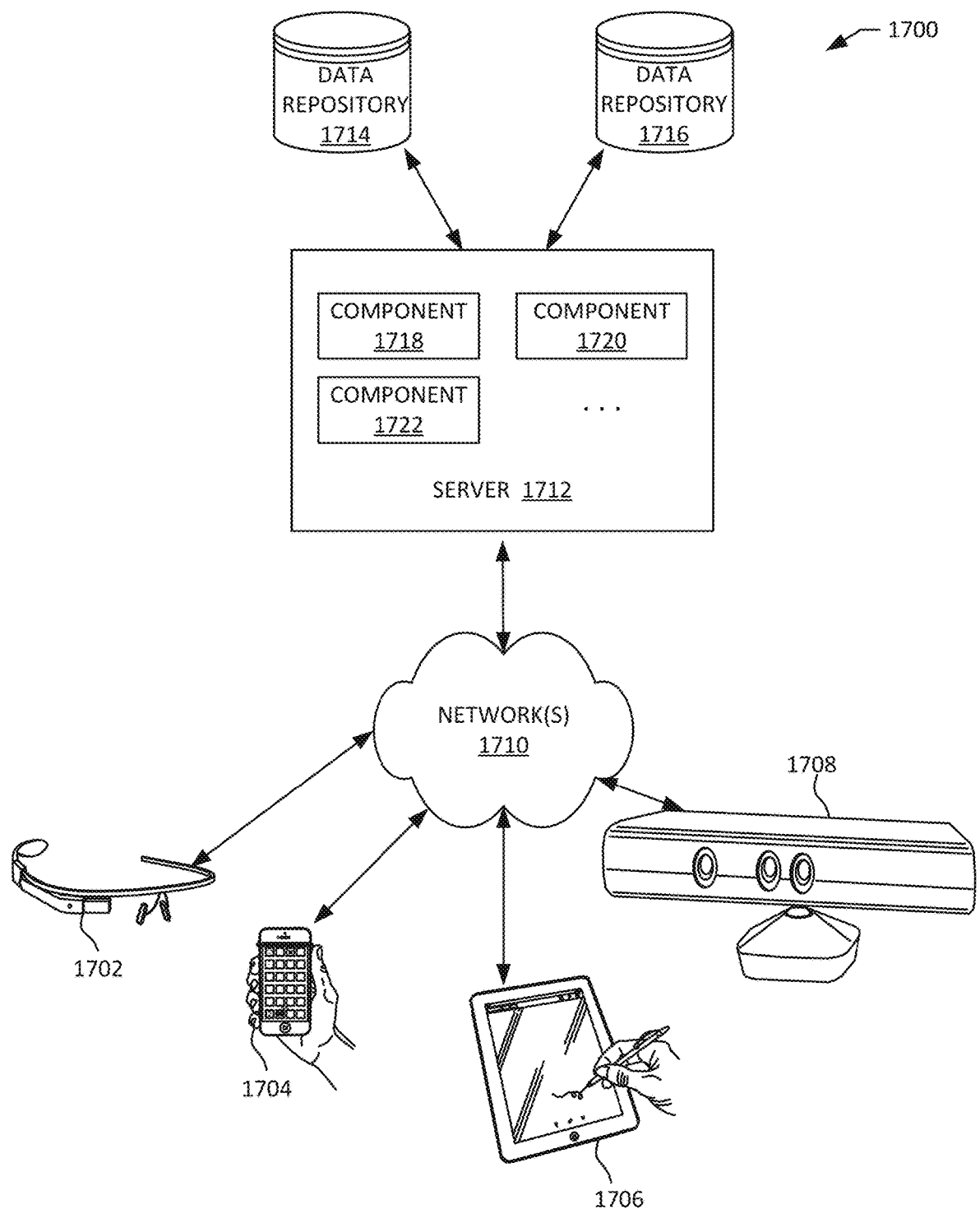
FIG. 17 depicts a simplified diagram of a distributed system.

FIG. 17 depicts a simplified diagram of a distributed system 1700. In the illustrated example, distributed system 1700 includes one or more client computing devices 1702, 1704, 1706, and 1708, coupled to a server 1712 via one or more communication networks 1710. Clients computing devices 1702, 1704, 1706, and 1708 may be configured to execute one or more applications.

In various examples, server 1712 may be adapted to run one or more services or software applications that enable a marker tracking system and/or a searching system, as described in this disclosure. For example, in certain examples, server 1712 may receive one or more documents. Server 1712 may then divide content in the one or more documents into groups. Server 1712 may also generate a token list and a token map for a document. For example, the token list may separate tokens in the document and the token map may indicate a plurality of locations associated with each token. Server 1712 may determine a difference between a first document and a second document based on token lists and token maps. Server 1712 may generate a group mapping between groups of a first document and groups of a second document. Server 1712 may also identify a first marker in a first document and place a second marker in a second document. The second marker may correspond to the first marker.

In certain examples, server 1712 may also provide other services or software applications that may include non-virtual and virtual environments. In some examples, these services may be offered as web-based or cloud services, such as under a Software as a Service (SaaS) model to the users of client computing devices 1702, 1704, 1706, and/or 1708. Users operating client computing devices 1702, 1704, 1706, and/or 1708 may in turn utilize one or more client applications to interact with server 1712 to utilize the services provided by these components.

In the configuration depicted in FIG. 17, server 1712 may include one or more components 1718, 1720 and 1722 that implement the functions performed by server 1712. These components may include software components that may be executed by one or more processors, hardware components, or combinations thereof. It should be appreciated that various different system configurations are possible, which may be different from distributed system 1700. The example shown in FIG. 17 is thus one example of a distributed system for implementing an example system and is not intended to be limiting.

Users may use client computing devices 1702, 1704, 1706, and/or 1708 to execute one or more applications, which may generate one or more storage requests that may then be serviced in accordance with the teachings of this disclosure. A client device may provide an interface that enables a user of the client device to interact with the client device. The client device may also output information to the user via this interface. Although FIG. 17 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g.,iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 1710 may be any type of network familiar to those skilled in the art that may support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 1710 may be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 1712 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1712 may include one or more virtual machines running virtual operating systems, or other computing architectures involving virtualization such as one or more flexible pools of logical storage devices that may be virtualized to maintain virtual storage devices for the server. In various examples, server 1712 may be adapted to run one or more services or software applications that provide the functionality described in the foregoing disclosure.

The computing systems in server 1712 may run one or more operating systems including any of those discussed above, as well as any commercially available server operating system. Server 1712 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 1712 may include one or more applications to analyze and consolidate data feeds and/or event updates received from users of client computing devices 1702, 1704, 1706, and 1708. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1712 may also include one or more applications to display the data feeds and/or real-time events via one or more display devices of client computing devices 1702, 1704, 1706, and 1708.

Distributed system 1700 may also include one or more data repositories 1714, 1716. These data repositories may be used to store data and other information in certain examples. For example, one or more of the data repositories 1714, 1716 may be used to store information such as information related to storage virtual machines, information mapping application IDs to application to selected storage virtual machines, and other information used by server 1712 when performing document functions. Data repositories 1714, 1716 may reside in a variety of locations. For example, a data repository used by server 1712 may be local to server 1712 or may be remote from server 1712 and in communication with server 1712 via a network-based or dedicated connection. Data repositories 1714, 1716 may be of different types. In certain examples, a data repository used by server 1712 may be a database, for example, a relational database, such as databases provided by Oracle Corporation® and other vendors. One or more of these databases may be adapted to enable storage, update, and retrieval of data to and from the database in response to SQL-formatted commands.

In certain examples, one or more of data repositories 1714, 1716 may also be used by applications to store application data. The data repositories used by applications may be of different types such as, for example, a key-value store repository, an object store repository, or a general storage repository supported by a file system.

Figure 18:
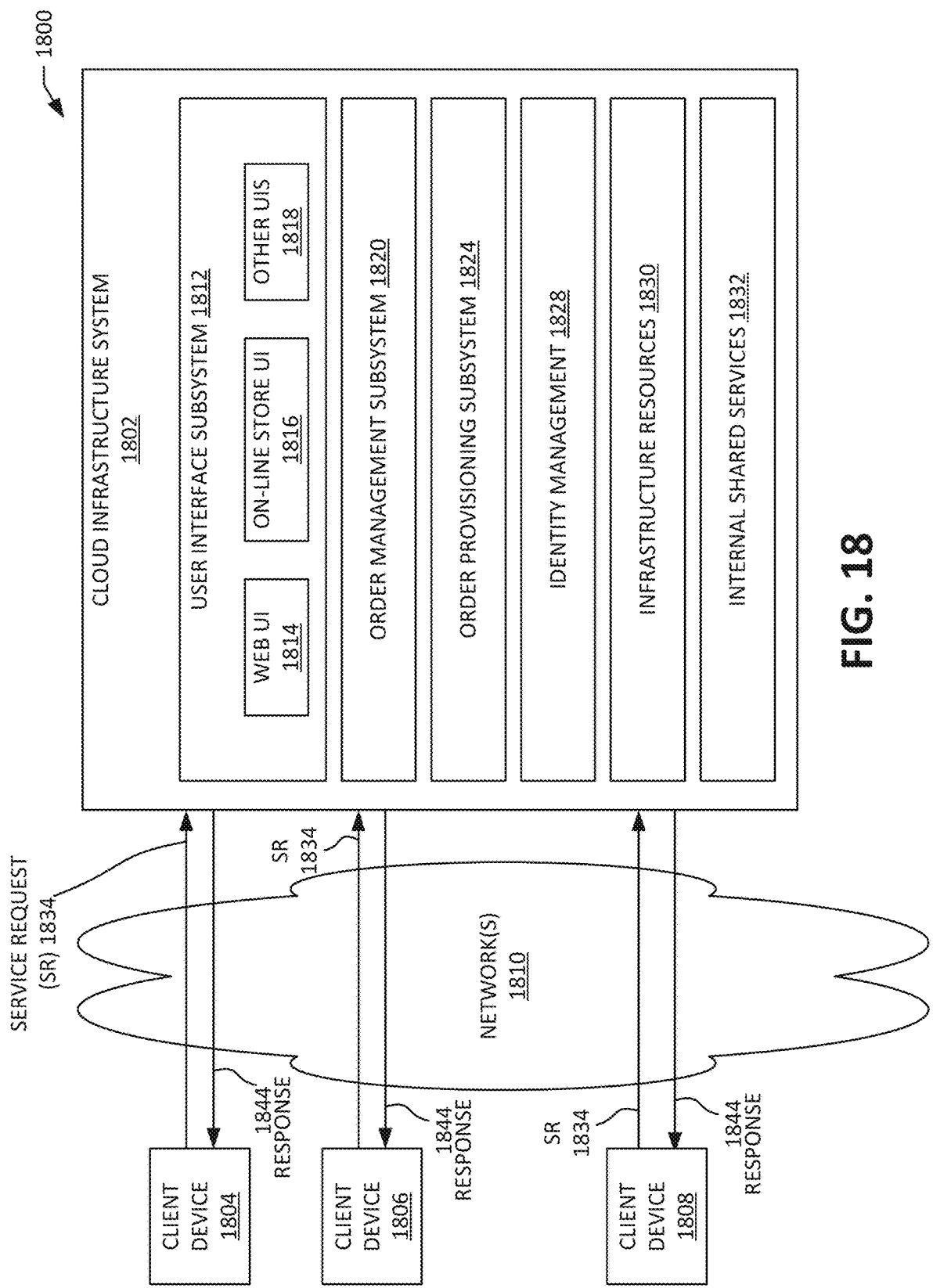
FIG. 18 is a simplified block diagram of a cloud-based system environment in which various document-related services may be offered as cloud services.

In certain examples, the document-related functionalities described in this disclosure may be offered as services via a cloud environment. FIG. 18 is a simplified block diagram of a cloud-based system environment in which various document services may be offered as cloud services, in accordance with certain examples. In the example depicted in FIG. 18, cloud infrastructure system 1802 may provide one or more cloud services that may be requested by users using one or more client computing devices 1804, 1806, and 1808. Cloud infrastructure system 1802 may comprise one or more computers and/or servers that may include those described above for server 1812. The computers in cloud infrastructure system 1802 may be organized as general purpose computers, specialized server computers, server farms, server clusters, or any other appropriate arrangement and/or combination.

Network(s) 1810 may facilitate communication and exchange of data between clients 1804, 1806, and 1808 and cloud infrastructure system 1802. Network(s) 1810 may include one or more networks. The networks may be of the same or different types. Network(s) 1810 may support one or more communication protocols, including wired and/or wireless protocols, for facilitating the communications.

The example depicted in FIG. 18 is only one example of a cloud infrastructure system and is not intended to be limiting. It should be appreciated that, in some other examples, cloud infrastructure system 1802 may have more or fewer components than those depicted in FIG. 18, may combine two or more components, or may have a different configuration or arrangement of components. For example, although FIG. 18 depicts three client computing devices, any number of client computing devices may be supported in alternative examples.

The term cloud service is generally used to refer to a service that is made available to users on demand and via a communication network such as the Internet by systems (e.g., cloud infrastructure system 1802) of a service provider. Typically, in a public cloud environment, servers and systems that make up the cloud service provider's system are different from the customer's own on-premise servers and systems. The cloud service provider's systems are managed by the cloud service provider. Customers may thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, Calif., such as middleware services, database services, Java cloud services, and others.

In certain examples, cloud infrastructure system 1802 may provide one or more cloud services using different models such as under a Software as a Service (SaaS) model, a Platform as a Service (PaaS) model, an Infrastructure as a Service (IaaS) model, and others, including hybrid service models. Cloud infrastructure system 1802 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 1802. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 1802. Cloud infrastructure system 1802 then performs processing to provide the services requested in the customer's subscription order. For example, a user may request the cloud infrastructure system to register an application, as described above, and provide document-related services to the application per the application's specified document-related requirements. Cloud infrastructure system 1802 may be configured to provide one or even multiple cloud services.

Cloud infrastructure system 1802 may provide the cloud services via different deployment models. In a public cloud model, cloud infrastructure system 1802 may be owned by a third party cloud services provider and the cloud services are offered to any general public customer, where the customer may be an individual or an enterprise. In certain other examples, under a private cloud model, cloud infrastructure system 1802 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other examples, under a community cloud model, the cloud infrastructure system 1802 and the services provided may be shared by several organizations in a related community. Various other models such as hybrids of the above mentioned models may also be used.

Client computing devices 1804, 1806, and 1808 may be of different types (such as devices 1702, 1704, 1706, and 1708 depicted in FIG. 17) and may be capable of operating one or more client applications. A user may use a client device to interact with cloud infrastructure system 1802, such as to request a service provided by cloud infrastructure system 1802. For example, a user may use a client device to request a document-related service described in this disclosure.

In some examples, the processing performed by cloud infrastructure system 1702 for providing document-related services may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 1802 for determining which storage virtual machine is to be selected for a particular application based on the application's stated document-related requirements. The data used for this analysis may include structured data (e.g., data stored in a database or structured according to a structured model) and/or unstructured data (e.g., data blobs (binary large objects)).

As depicted in the example in FIG. 18, cloud infrastructure system 1802 may include infrastructure resources 1830 that are utilized for facilitating the provision of various cloud services offered by cloud infrastructure system 1802. Infrastructure resources 1830 may include, for example, processing resources, storage or memory resources, networking resources, and the like. In certain examples, the storage virtual machines that are available for servicing storage requested from applications may be part of cloud infrastructure system 1802. In other examples, the storage virtual machines may be part of different systems.

In certain examples, to facilitate efficient provisioning of these resources for supporting the various cloud services provided by cloud infrastructure system 1802 for different customers, the resources may be bundled into sets of resources or resource modules (also referred to as "pods"). Each resource module or pod may comprise a pre-integrated and optimized combination of resources of one or more types. In certain examples, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 1802 may itself internally use services 1832 that are shared by different components of cloud infrastructure system 1802 and which facilitate the provisioning of services by cloud infrastructure system 1802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 1802 may comprise multiple subsystems. These subsystems may be implemented in software, or hardware, or combinations thereof. As depicted in FIG. 18, the subsystems may include a user interface subsystem 1812 that enables users or customers of cloud infrastructure system 1802 to interact with cloud infrastructure system 1802. User interface subsystem 1812 may include various different interfaces such as a web interface 1814, an online store interface 1816 where cloud services provided by cloud infrastructure system 1802 are advertised and are purchasable by a consumer, and other interfaces 1818. For example, a customer may, using a client device, request (service request 1834) one or more services provided by cloud infrastructure system 1802 using one or more of interfaces 1814, 1816, and 1818. For example, a customer may access the online store, browse cloud services offered by cloud infrastructure system 1802, and place a subscription order for one or more services offered by cloud infrastructure system 1802 that the customer wishes to subscribe to. The service request may include information identifying the customer and one or more services that the customer desires to subscribe to. For example, a customer may place a subscription order for a document-related service offered by cloud infrastructure system 1802. As part of the order, the customer may provide information identifying an application for which the service is to be provided and the one or more credentials for the application.

In certain examples, such as the example depicted in FIG. 18, cloud infrastructure system 1802 may comprise an order management subsystem (OMS) 1820 that is configured to process the new order. As part of this processing, OMS 1820 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 1820 may then invoke the order provisioning subsystem (OPS) 1824 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 1824 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based on the number of users to be supported by the service, the duration of time for which the service is being requested, and the like. The allocated pods may then be customized for the particular requesting customer for providing the requested service.

In certain examples, setup phase processing, as described above, may be performed by cloud infrastructure system 1802 as part of the provisioning process. Cloud infrastructure system 1802 may generate an application ID and select a storage virtual machine for an application from among storage virtual machines provided by cloud infrastructure system 1802 itself or from storage virtual machines provided by other systems other than cloud infrastructure system 1802.

Cloud infrastructure system 1802 may send a response or notification 1844 to the requesting customer to indicate when the requested service is now ready for use. In some instances, information (e.g., a link) may be sent to the customer that enables the customer to start using and availing the benefits of the requested services. In certain examples, for a customer requesting the document-related service, the response may include an application ID generated by cloud infrastructure system 1802 and information identifying a virtual machine selected by cloud infrastructure system 1802 for an application corresponding to the application ID.

Cloud infrastructure system 1802 may provide services to multiple customers. For each customer, cloud infrastructure system 1802 is responsible for managing information related to one or more subscription orders received from the customer, maintaining customer data related to the orders, and providing the requested services to the customer. Cloud infrastructure system 1802 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 1802 may provide services to multiple customers in parallel. Cloud infrastructure system 1802 may store information for these customers, including possibly proprietary information. In certain examples, cloud infrastructure system 1802 comprises an identity management subsystem (IMS) 1828 that is configured to manage customer information and provide the separation of the managed information such that information related to one customer is not accessible by another customer. IMS 1828 may be configured to provide various security-related services such as identity services, such as information access management, authentication and authorization services, services for managing customer identities and roles and related capabilities, and the like.

Figure 19:
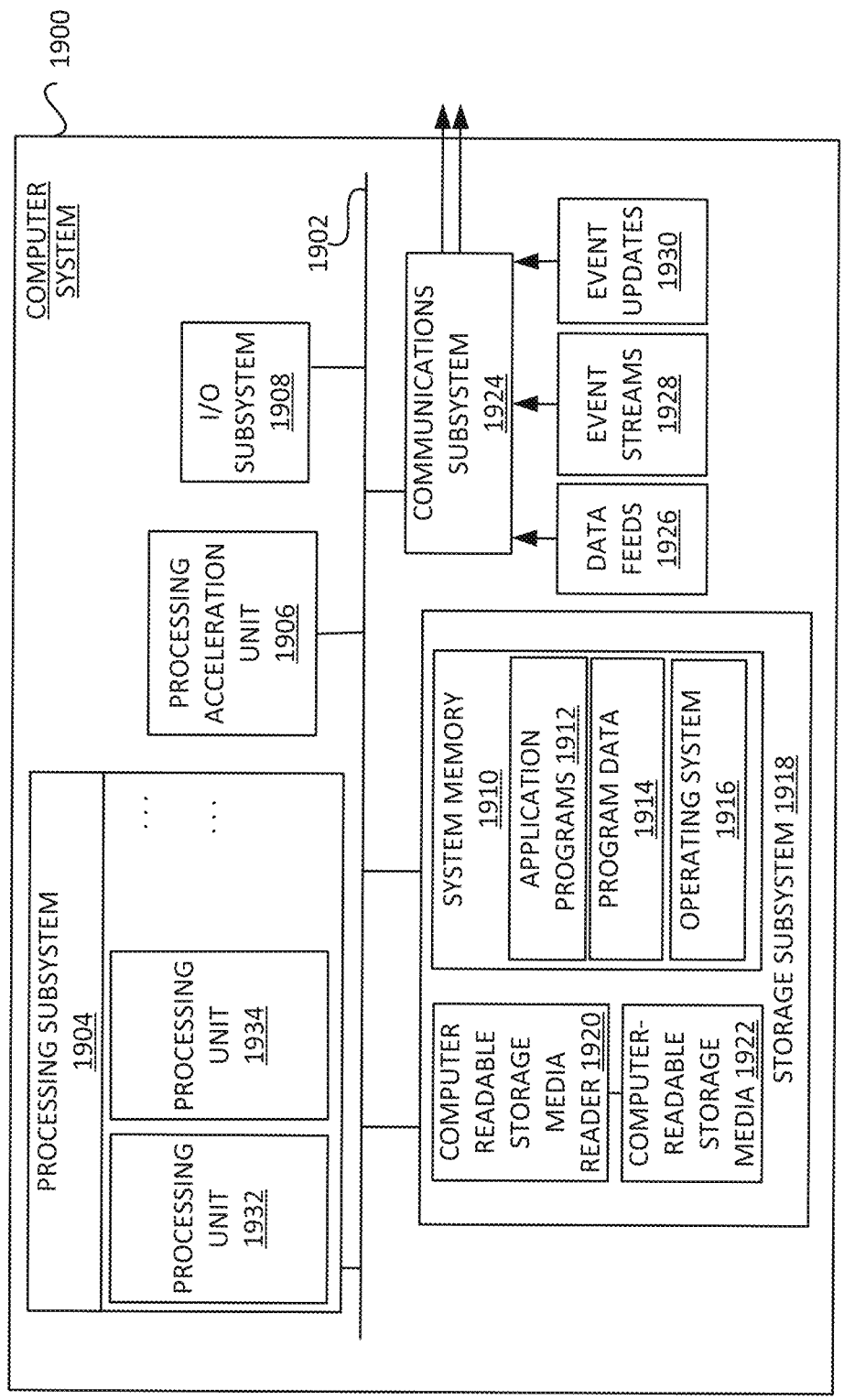
FIG. 19 illustrates an example of a computer system.

FIG. 19 illustrates an example of computer system 1900. In some examples, computer system 1900 may be used to implement any of the application system, access management system, systems within a data center, and various servers and computer systems described above. As shown in FIG. 19, computer system 1900 includes various subsystems including a processing subsystem 1904 that communicates with a number of other subsystems via a bus subsystem 1902. These other subsystems may include a processing acceleration unit 1906, an I/O subsystem 1908, a storage subsystem 1918, and a communications subsystem 1924. Storage subsystem 1918 may include non-transitory computer-readable storage media including storage media 1922 and a system memory 1910.

Bus subsystem 1902 provides a mechanism for letting the various components and subsystems of computer system 1900 communicate with each other as intended. Although bus subsystem 1902 is shown schematically as a single bus, alternative examples of the bus subsystem may utilize multiple buses. Bus subsystem 1902 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

Processing subsystem 1904 controls the operation of computer system 1900 and may comprise one or more processors, application specific integrated circuits (ASICs), or field programmable gate arrays (FPGAs). The processors may include be single core or multicore processors. The processing resources of computer system 1900 may be organized into one or more processing units 1932, 1934, etc. A processing unit may include one or more processors, one or more cores from the same or different processors, a combination of cores and processors, or other combinations of cores and processors. In some examples, processing subsystem 1804 may include one or more special purpose co-processors such as graphics processors, digital signal processors (DSPs), or the like. In some examples, some or all of the processing units of processing subsystem 1804 may be implemented using customized circuits, such as application specific integrated circuits (ASICs), or field programmable gate arrays (FPGAs).

In some examples, the processing units in processing subsystem 1904 may execute instructions stored in system memory 1910 or on computer readable storage media 1922. In various examples, the processing units may execute a variety of programs or code instructions and may maintain multiple concurrently executing programs or processes. At any given time, some or all of the program code to be executed may be resident in system memory 1910 and/or on computer-readable storage media 1922 including potentially on one or more storage devices. Through suitable programming, processing subsystem 1904 may provide various functionalities described above. In instances where computer system 1900 is executing one or more virtual machines, one or more processing units may be allocated to each virtual machine.

In certain examples, a processing acceleration unit 1906 may optionally be provided for performing customized processing or for off-loading some of the processing performed by processing subsystem 1904 so as to accelerate the overall processing performed by computer system 1900.

I/O subsystem 1908 may include devices and mechanisms for inputting information to computer system 1900 and/or for outputting information from or via computer system 1900. In general, use of the term input device is intended to include all possible types of devices and mechanisms for inputting information to computer system 1900. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 1900 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1918 provides a repository or data store for storing information and data that is used by computer system 1900. Storage subsystem 1918 provides a tangible non-transitory computer-readable storage medium for storing the basic programming and data constructs that provide the functionality of some examples. Storage subsystem 1918 may store software (e.g., programs, code modules, instructions) that when executed by processing subsystem 1904 provides the functionality described above. The software may be executed by one or more processing units of processing subsystem 1904. Storage subsystem 1918 may also provide document comparing, marking, or searching in accordance with the teachings of this disclosure.

Storage subsystem 1918 may include one or more non-transitory memory devices, including volatile and non-volatile memory devices. As shown in FIG. 19, storage subsystem 1918 includes a system memory 1910 and a computer-readable storage media 1922. System memory 1910 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1900, such as during start-up, may typically be stored in the ROM. The RAM typically contains data and/or program modules that are presently being operated and executed by processing subsystem 1904. In some implementations, system memory 1910 may include multiple different types of memory, such as static random access memory (SRAM), dynamic random access memory (DRAM), and the like.

By way of example, and not limitation, as depicted in FIG. 19, system memory 1910 may load application programs 1912 that are being executed, which may include various applications such as Web browsers, mid-tier applications, relational database management systems (RDBMS), etc. program data 1914, and an operating system 1916. By way of example, operating system 1916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 1922 may store programming and data constructs that provide the functionality of some examples. Computer-readable media 1922 may provide storage of computer-readable instructions, data structures, program modules, and other data for computer system 1900. Software (programs, code modules, instructions) that, when executed by processing subsystem 1904 provides the functionality described above, may be stored in storage subsystem 1918. By way of example, computer-readable storage media 1922 may include non-volatile memory such as a hard disk drive, a magnetic disk drive, an optical disk drive such as a CD ROM, DVD, a Blu-Ray® disk, or other optical media. Computer-readable storage media 1722 may include, but is not limited to, Zip® drives, flash memory cards, universal serial bus (USB) flash drives, secure digital (SD) cards, DVD disks, digital video tape, and the like. Computer-readable storage media 1722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain examples, storage subsystem 1918 may also include a computer-readable storage media reader 1920 that may further be connected to computer-readable storage media 1922. Reader 1920 may receive and be configured to read data from a memory device such as a disk, a flash drive, etc.

In certain examples, computer system 1900 may support virtualization technologies, including but not limited to virtualization of processing and memory resources. For example, computer system 1900 may provide support for executing one or more virtual machines. In certain examples, computer system 1900 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 1900. Accordingly, multiple operating systems may potentially be run concurrently by computer system 1900.

Communications subsystem 1924 provides an interface to other computer systems and networks. Communications subsystem 1924 serves as an interface for receiving data from and transmitting data to other systems from computer system 1900. For example, communications subsystem 1924 may enable computer system 1900 to establish a communication channel to one or more client devices via the Internet for receiving and sending information from and to the client devices. For example, when computer system 1900 is used to implement marker tracking system 1030 depicted in FIG. 10 or searching system 1630 depicted in FIG. 16, the communication subsystem may be used to communicate with an application system and also a system executing a storage virtual machine selected for an application.

Communication subsystem 1924 may support both wired and/or wireless communication protocols. In certain examples, communications subsystem 1924 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some examples, communications subsystem 1924 may provide wired network connectivity (e.g., Ethernet) in addition to or instead of a wireless interface.

Communication subsystem 1924 may receive and transmit data in various forms. In some examples, in addition to other forms, communications subsystem 1924 may receive input communications in the form of structured and/or unstructured data feeds 1926, event streams 1928, event updates 1930, and the like. For example, communications subsystem 1924 may be configured to receive (or send) data feeds 1926 in real-time from users of social media networks and/or other communication services such as Twitter® feeds, Facebook® updates, web feeds such as Rich Site Summary (RSS) feeds, and/or real-time updates from one or more third party information sources.

In certain examples, communications subsystem 1924 may be configured to receive data in the form of continuous data streams, which may include event streams 1928 of real-time events and/or event updates 1930, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1924 may also be configured to communicate data from computer system 1900 to other computer systems or networks. The data may be communicated in various different forms such as structured and/or unstructured data feeds 1926, event streams 1928, event updates 1930, and the like to one or more databases that may be in communication with one or more streaming data source computers coupled to computer system 1900.

Computer system 1900 may be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 1900 depicted in FIG. 19 is intended only as a specific example. Many other configurations having more or fewer components than the system depicted in FIG. 19 are possible. Based on the disclosure and teachings provided herein, a person of ordinary skill in the art will appreciate other ways and/or methods to implement the various examples.

Although specific examples have been described, various modifications, alterations, alternative constructions, and equivalents are possible. Examples are not restricted to operation within certain specific data processing environments, but are free to operate within a plurality of data processing environments. Additionally, although certain examples have been described using a particular series of transactions and steps, it should be apparent to those skilled in the art that this is not intended to be limiting. Although some flowcharts describe operations as a sequential process, many of the operations may be performed in parallel or concurrently. In addition, the order of the operations may be rearranged. A process may have additional steps not included in the figure. Various features and aspects of the above-described examples may be used individually or jointly.

Further, while certain examples have been described using a particular combination of hardware and software, it should be recognized that other combinations of hardware and software are also possible. Certain examples may be implemented only in hardware, or only in software, or using combinations thereof. The various processes described herein may be implemented on the same processor or different processors in any combination.

Where devices, systems, components or modules are described as being configured to perform certain operations or functions, such configuration may be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes may communicate using a variety of techniques including but not limited to conventional techniques for inter-process communications, and different pairs of processes may use different techniques, or the same pair of processes may use different techniques at different times.

Specific details are given in this disclosure to provide a thorough understanding of the examples. However, examples may be practiced without these specific details. For example, well-known circuits, processes, algorithms, structures, and techniques have been shown without unnecessary detail in order to avoid obscuring the examples. This description provides example examples only, and is not intended to limit the scope, applicability, or configuration of other examples. Rather, the preceding description of the examples will provide those skilled in the art with an enabling description for implementing various examples. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific examples have been described, these are not intended to be limiting. Various modifications and equivalents are within the scope of the following claims.

In the foregoing specification, aspects of the disclosure are described with reference to specific examples thereof, but those skilled in the art will recognize that the disclosure is not limited thereto. Various features and aspects of the above-described disclosure may be used individually or jointly. Further, examples may be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate examples, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

While illustrative examples of the application have been described in detail herein, it is to be understood that the inventive concepts may be otherwise variously embodied and employed, and that the appended claims are intended to be construed to include such variations, except as limited by the prior art.

What is claimed is:

1. A method comprising:
receiving information identifying a first document and a second document, wherein the first document includes a first marker located at a first location in the first document and wherein the second document a modified version of the first document;
identifying, based upon the first location of the first marker in the first document, a first token from a first token list for the first document;
identifying, from a first set of one or more token groups generated for the first document based upon contents of the first document, a first token group that includes the first token;
identifying, from a second set of one or more token groups generated for the second document based upon contents of the second document, a second token group based on the first token group,
wherein identifying the second token group comprises determining, based upon a group mapping, that the second token group for the second document corresponds to the first token group for the first document, the group mapping identifying mappings between token groups in a first set of token groups and token groups in a second set of token groups;
determining a location of the second token group within the second document which is the modified version of the first document; and
adding a second marker to the second document at a location based upon the location of the second token group within the second document, wherein the second marker in the second document corresponds to the first marker in the first document.

2. The method according to claim 1, wherein the first token list comprises a plurality of tokens corresponding to words within the first document.

3. The method of claim 1, wherein the first marker includes a comment, a highlight, an HTML tag, or other item associated with one or more tokens within the first document.

4. The method according to claim 1, further comprising:
generating a first token map for the first token list, wherein the first token map comprises a position identifier of tokens in a sequence of tokens in the first token list and a token group identifier that identifies a token group that includes the tokens in the first token list;
generating a second token map for the second token group, wherein the second token map comprises a position identifier of tokens in a sequence of tokens in a second token list and a token group identifier that identifies the token group that includes the tokens in the second token list; and
generating difference information identifying differences between the first token list and the second token list based on the first token map and the second token map.

5. The method according to claim 4, wherein the difference information indicates whether a token was added, removed, or modified in the second token list relative to the first token list.

6. The method of claim 1, wherein identifying the second token group comprises:
   determining, based upon the group mapping, that the first token group does not have a corresponding token group in a second set of token groups, the group mapping identifying mappings between token groups in the first set of token groups and token groups in the second set of token groups;
   identifying a third token group from the first set of token groups; and
   determining, based upon the group mapping, that the second token group in the second set of token groups corresponds to the third token group.

7. The method of claim 6, wherein identifying the third token group comprises:
   identifying another token group in the first set of token groups that is located adjacent to the location of the first token group in the first document; and
   determining, based upon the group mapping, whether the another token group has a corresponding token group in the second set of token groups.

8. The method of claim 6, wherein identifying the third token group further comprises:
   determining, based upon the group mapping, that the another token group does not have a corresponding token group in the second set of token groups;
   identifying yet another token group in the first set of token groups that is located adjacent to the location of the first token group in the first document; and
   determining, based upon the group mapping, whether the yet another token group has a corresponding token group in the second set of token groups.

9. The method of claim 1, wherein the first document is formatted according to a markup language, the method further comprising:
   identifying a set of opening markup tags and a set of corresponding closing markup tags in the first document; and
   dividing the first document into sets of token groups based on the set of opening markup tags and the set of corresponding closing markup tags, wherein contents of the first document between an opening markup tag from the set of opening markup tags and a corresponding closing markup tag from the set of corresponding closing markup tags from a token group within the first set of token groups.

10. A non-transitory computer-readable storage medium storing a plurality of instructions executable by one or more processors, the plurality of instructions when executed by the one or more processors cause the one or more processors to:
   receive information identifying a first document and a second document, wherein the first document includes a first marker located at a first location in the first document and wherein the second document is a modified version of the first document;
   identify, based upon the first location of the first marker in the first document, a first token from a first token list for the first document;
   identify, from a first set of one or more token groups generated for the first document based upon contents of the first document, a first token group that includes the first token;
   identify, from a second set of one or more token groups generated for the second document based upon contents of the second document, a second token group corresponding with the first token group;
   determine a location of the second token group within the second document,
   wherein identifying the second token group comprises determining, based upon a group mapping, that the second token group for the second document corresponds to the first token group for the first document, the group mapping identifying mappings between token groups in a first set of token groups and token groups in a second set of token groups; and
   add a second marker to the second document at a location based upon the location of the second token group within the second document, wherein the second marker in the second document corresponds to the first marker in the first document.

11. The computer-readable storage medium according to claim 10, wherein the first token list comprises a plurality of tokens corresponding to words within the first document.

12. The computer-readable storage medium according to claim 10, wherein the first marker includes a comment, a highlight, an HTML tag, or other item associated with one or more tokens within the first document.

13. The computer-readable storage medium according to claim 10, further comprising instructions when executed by the one or more processors cause the one or more processors to:
   generate a first token map for the first token list, wherein the first token map comprises a position identifier of tokens in a sequence of tokens in the first token list and a token group identifier that identifies a token group that includes the tokens in the first token list;
   generate a second token map for the second token group, wherein the second token map comprises a position identifier of tokens in a sequence of tokens in a second token list and a token group identifier that identifies the token group that includes the tokens in a second token list; and
   generate difference information identifying differences between the first token list and the second token list based on the first token map and the second token map.

14. The computer-readable storage medium according to claim 13, wherein the difference information indicates whether a token was added, removed, or modified in the second token list relative to the first token list.

15. A system comprising:
   one or more processors; and
   a non-transitory computer-readable medium including instructions that, when executed by the one or more processors, cause the one or more processors to:
      receive information identifying a first document and a second document, wherein the first document includes a first marker located at a first location in the first document and wherein the second document is a modified version of the first document;
      identify, based upon the first location of the first marker in the first document, a first token from a first token list for the first document;
      identify, from a first set of one or more token groups generated for the first document based upon contents of the first document, a first token group that includes the first token;
      identify, from a second set of one or more token groups generated for the second document based upon contents of the second document, a second token group corresponding with the first token group, wherein identifying the second token group comprises determining, based upon a group mapping, that the second token group for the second document corresponds to the first token group for the first document, the group mapping identifying mappings between token groups in a first set of token groups and token groups in a second set of token groups;

determine a location of the second token group within the second document; and add a second marker to the second document at a location based upon the location of the second token group within the second document, wherein the second marker in the second document corresponds to the first marker in the first document.

16. The system according to claim 15, wherein the first token list comprises a plurality of tokens corresponding to words within the first document.

17. The system according to claim 15, wherein the first marker includes a comment, a highlight, an HTML tag, or other item associated with one or more tokens within the first document.

18. The system according to claim 15, further comprising instructions that, when executed by the one or more processors, cause the one or more processors to:

generate a first token map for the first token list, wherein the first token map comprises a position identifier of tokens in a sequence of tokens in the first token list and a token group identifier that identifies a token group that includes the tokens in the first token list;

generate a second token map for the second token group, wherein the second token map comprises a position identifier of tokens in a sequence of tokens in a second token list and a token group identifier that identifies the token group that includes the tokens in the second token list; and generate difference information identifying differences between the first token list and the second token list based on the first token map and the second token map.

19. The system according to claim 18, wherein the difference information indicates whether a token was added, removed, or modified in the second token list relative to the first token list.

\* \* \* \* \*

UNITED STATES PATENT AND TRADEMARK OFFICE
CERTIFICATE OF CORRECTION

PATENT NO. : 11,514,240 B2
APPLICATION NO. : 17/382718
DATED : November 29, 2022
INVENTOR(S) : Diamond et al.

It is certified that error appears in the above-identified patent and that said Letters Patent is hereby corrected as shown below:

In the Specification

In Column 2, Line 11, delete "HTML," and insert -- HTML --, therefor.

In the Claims

In Column 32, Line 40, in Claim 13, delete "in a" and insert -- in the --, therefor.

Signed and Sealed this
Eighth Day of August, 2023

Katherine Kelly Vidal
*Director of the United States Patent and Trademark Office*